(12) United States Patent
Cooper et al.

(10) Patent No.: US 7,783,106 B2
(45) Date of Patent: Aug. 24, 2010

(54) VIDEO SEGMENTATION COMBINING SIMILARITY ANALYSIS AND CLASSIFICATION

(75) Inventors: Matthew L. Cooper, San Francisco, CA (US); Ting Liu, Pittsburgh, PA (US); Eleanor G. Rieffel, Mountain View, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1161 days.

(21) Appl. No.: 10/987,688

(22) Filed: Nov. 12, 2004

(65) Prior Publication Data

US 2006/0107216 A1    May 18, 2006

(51) Int. Cl.
- *G06K 9/34* (2006.01)
- *G06K 9/62* (2006.01)
- *G06K 9/00* (2006.01)
- *H04N 5/14* (2006.01)
- *H04N 9/64* (2006.01)

(52) U.S. Cl. ............... 382/173; 382/159; 382/181; 382/197; 382/224; 382/225; 348/700

(58) Field of Classification Search .......... 382/159, 382/173, 181, 197, 224, 225; 348/700, 701
See application file for complete search history.

(56) References Cited

U.S. PATENT DOCUMENTS

| | | | |
|---|---|---|---|
| 6,072,542 A * | 6/2000 | Wilcox et al. ............ 348/722 |
| 6,366,296 B1 | 4/2002 | Boreczky et al. | |
| 6,404,925 B1 | 6/2002 | Foote et al. | |
| 6,493,042 B1 * | 12/2002 | Bozdagi et al. ............ 348/700 |
| 6,535,639 B1 | 3/2003 | Uchihachi et al. | |
| 6,542,869 B1 * | 4/2003 | Foote .......................... 704/500 |
| 6,570,555 B1 | 5/2003 | Prevost et al. | |
| 6,751,354 B2 | 6/2004 | Foote et al. | |
| 6,774,917 B1 | 8/2004 | Foote et al. | |
| 6,807,361 B1 | 10/2004 | Girgensohn et al. | |
| 7,123,769 B2 * | 10/2006 | Xiong ....................... 382/199 |
| 7,151,852 B2 * | 12/2006 | Gong et al. ................ 382/173 |
| 7,177,470 B2 * | 2/2007 | Jasinschi et al. .......... 382/170 |
| 2003/0160944 A1 * | 8/2003 | Foote et al. ................ 352/1 |
| 2004/0208377 A1 * | 10/2004 | Loui et al. ................ 382/224 |

OTHER PUBLICATIONS

Cooper, Matthew, Jonathan Foote, Andreas Girgensohn, and Lynn Wilcox. "Temporal Event Clustering for Digital Photo Collections." ACM Multimedia 2003. (2003).*

Ide, Ichiro, Koji Yamamoto, and Hidehiko Tanaka. "Automatic Video Indexing Based on Shot Classification." Lecture Notes In Computer Science; Proceedings of the First International Conference on Advanced Multimedia Content Processing 1554(1998): 87-102.*

(Continued)

*Primary Examiner*—Bhavesh M Mehta
*Assistant Examiner*—Michael A Newman
(74) *Attorney, Agent, or Firm*—Fliesler Meyer LLP

(57) ABSTRACT

Techniques for media segmentation are disclosed. A number of measures used to generate similarity values are compared. Two different approaches to calculate feature vectors based on pairwise frame similarity in combination with different kernel functions are disclosed. A supervised classification method is used with the feature vectors to assess segment boundaries.

26 Claims, 10 Drawing Sheets

OTHER PUBLICATIONS

Qi, Yanjun, A. Hauptmann, and Ting Liu. "Supervised Classification for Video Shot Segmentation." Multimedia and Expo, 2003. ICME '03. Proceedings. 2003 International Conference on 2(2003): 689-692.*

Cooper, Matthew. "Video Segmentation Combining Similarity Analysis and Classification." ACM Multimedia 2004. (2004).*

Cooper et al. "Temporal Event Clustering for Digital Photo Collections." ACM Multimedia 2003. (2003).*

Iacob, Sorin M., and Reginald L. Lagendijk, Maria E. Jacob. "Chapter 12—Asymmetric Similarity Measures For Video Summarisation." State-of-the-Art in Content-Based Image and Video Retrieval I(2001): 255-275.*

Cooper et al., "Temporal Event Clustering for Digital Photo Collections." ACM Multimedia 2003. (2003).*

Boreczky, et al. "Comparison of video shot boundary detection techniques." Journal of Electronic Imaging. 5.2 (1996): 122-128. Print.*

Patel, et al. "Video Shot Detection and Characterization for Video Databases." Pattern Recognition. 30.4 (1997): 583-592. Print.*

Smeaton, A. et al., "The TREC 2002 Video Track Report," Proc. TREC Video Track (2002).

Gunsel, B. et al., "Temporal Video Segmentation Using Unsupervised Clustering and Semantic Object Tracking," J. Electronic Imaging 7(3):592-604 (1998).

Cooper, M.L. et al., "Scene Boundary Detection via Video Self-Similarity Analysis," Proc. IEEE Intl. Conf. on Image Processing, 378-381 (2001).

Boreczky, J. et al., "Comparison of Video Shot Boundary Detection Techniques," Proc. SPIE Storage and Retrieval for Image and Video Databases, 10 pp. (1996).

Witkin, A.P., "Scale-Space Filtering: A New Approach to Multi-Scale Description," Image Understanding, vol. 3, pp. 39A.1.1-39.A.1.4, S. Ollman & W. Richards eds., Norwood, NY (1984).

Slaney, M. et al., "Multimedia Edges: Finding Hierarchy in all Dimensions," Proc. 9th ACM Intl. Conf. Multimedia, Ottawa, Ontario, Sep. 30-Oct. 5, 2001, 12 pp.

Pye, D. et al., "Audio-Visual Segmentation for Content-Based Retrieval," Proc. Intl. Conf. on Spoken Lang. Processing, 4 pp. (1998).

Pickering, M. et al., "Video Retrieval Using Global Features in Keyframes," Proc. TREC Video Track, 7 pp. (2002).

Qi, Y. et al., "Supervised Classification for Video Shot Segmentation," Proc. IIIE Conf. on Multimedia & Expo, Baltimore, MD, Jul. 6-9, 2003, 4 pp.

Liu, T. et al., "Efficient Exact k-NN and Nonparametric Classification in High Dimensions," Proc. Neural Information Processing Systems, 8 pp. (2003).

Cooper, M.L. et al., "Shot Boundary Detection via Similarity Analysis," Proc. TRECVID 2003, Mar. 1, 2004, 8 pp.

Cooper, M.L. et al., "Summarizing Popular Music via Structural Similarity Analysis," 2003 IEEE Workshop Applications of Signal Processing to Audio and Acoustics, Oct. 19-22, 2003, New Paltz, NY, 4 pp.

Cooper, M.L. et al., "Automatically Organizing Digital Photographs Using Time and Content," Proc. IEEE Intl. Conf. on Image Processing, Sep. 14, 2003, 4 pp.

Cooper, M.L. et al., "Automatic Music Summarization via Similarity Analysis," 2002 International Symposium on Music Information Retrieval, Oct. 13, 2002, 5 pp.

Cooper, M.L. et al., "Summarizing Video Using Non-Negative Similarity Matrix Factorization," IEEE Multimedia Signal Processing Workshop, Dec. 11, 2002, 4 pp.

Foote, J.T. et al., "Media Segmentation using Self-Similarity Decomposition," Proc. SPIE Storage and Retrieval for Multimedia Databases, 5021:167-175 (2003).

Cooper, M.L. et al., "Quadratic Analysis of Information Measures for Object Recognition," Proc. SPIE 3721:819-827 (1999).

Koprinska, I. et al., "Temporal Video Segmentation: A Survey," Signal Processing: Image Comm., vol. 16, 477-500 (2001).

Lienhart, R., "Reliable Transition Detection in Videos: A Survey and Practitioner's Guide," Intl. J. Image & Graphics 1(3):469-486 (2001).

* cited by examiner

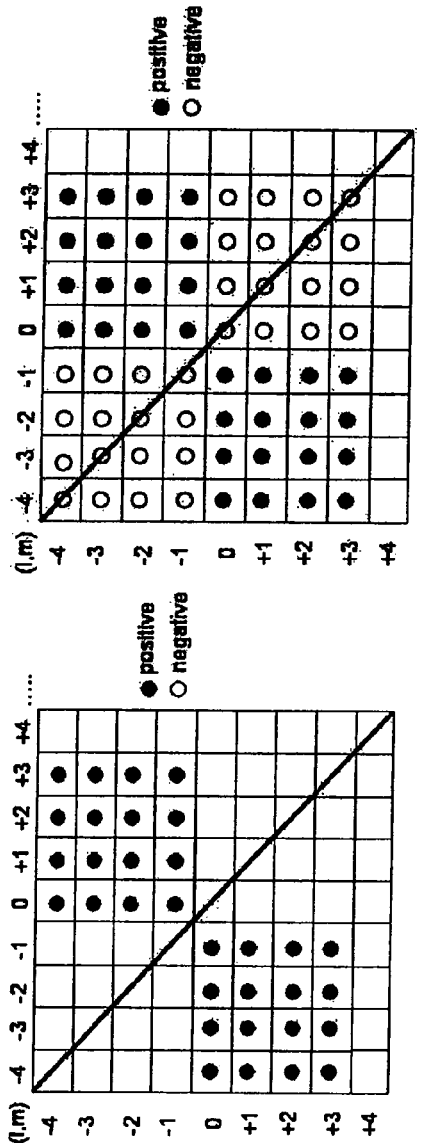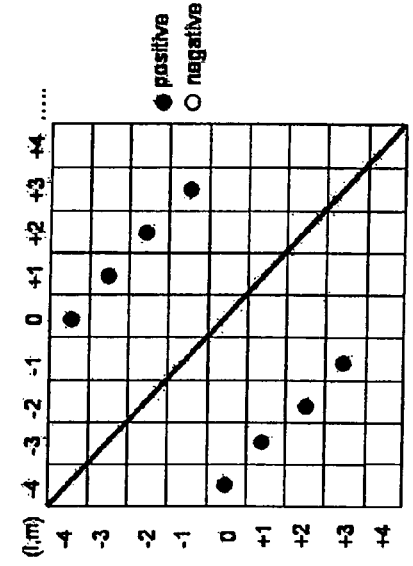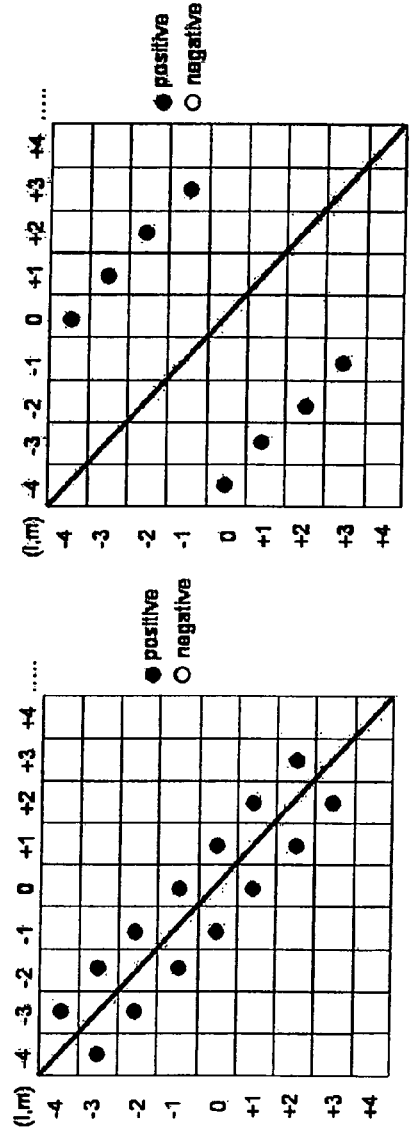
Figure 3A
Figure 3B
Figure 3C
Figure 3D

In general, $S*K=v_L$

For $L=3$, where $b, c, d, \ldots$ are the similarity vaues stored in $S$ on which $K$ operates $$\begin{bmatrix} bcdefg \\ hijklm \\ opqrst \\ uvwxyz \\ \alpha\beta\chi\delta\varepsilon\phi \\ \gamma\eta\iota\kappa\lambda\mu \end{bmatrix} * \begin{bmatrix} 000111 \\ 000111 \\ 000111 \\ 111000 \\ 111000 \\ 111000 \end{bmatrix} = v_3(n)$$

For $L=2$, where $i, j, k, \ldots$ are the similarity vaues stored in $S$ on which $K$ operates $$\begin{bmatrix} ijkl \\ pqrs \\ vwxy \\ \beta\chi\delta\varepsilon \end{bmatrix} * \begin{bmatrix} 0011 \\ 0011 \\ 1100 \\ 1100 \end{bmatrix} = v_2(n)$$

Figure 4

VIDEO SEGMENTATION COMBINING SIMILARITY ANALYSIS AND CLASSIFICATION

BACKGROUND OF THE INVENTION

1. Field of the Invention

The present invention relates to a method for identifying segment boundaries based on affinity or similarity matrices.

2. Description of the Related Art

Early techniques of automatic extraction of videos focused on cut-boundary detection. The major techniques used have been detection of pixel differences, statistical differences, histogram comparisons, edge differences, compression differences and motion vectors. Histograms are the most common method used to detect shot boundaries. The simplest method computes gray level histograms of the images. Previously, a frame-indexed novelty score was typically computed by correlating a small kernel function along the main diagonal of the similarity matrix, and local maxima in the novelty score were taken to be the segment boundaries.

A number of kernel correlation functions have previously been described for segmentation in videos. Scale-space (SS) analysis compares adjacent time samples and corresponds to using a kernel with non-zero elements only in the first diagonal above or below the main diagonal, i.e. the elements $S(n, n+1)$. Diagonal cross similarity (DCS), is an alternative detection approach. A DCS kernel ($K_{DCS}$), when centered on a segment boundary, weights only elements of S that compare time-samples separated by a fixed interval (L) from different segments. In the correlation calculation, the elements of S for which $K_{DCS}>0$ lie on the $L^{th}$ diagonal above (and below) the main diagonal of S. A full similarity kernel ($K_{FS}$), and cross similarity kernel ($K_{CS}$) have also been described.

Most media segmentation techniques threshold on adjacent frame similarity values rather than incorporating a classifier. Only recently have accelerated exact kNN classifiers been adopted for video shot segmentation analysis. However, the frame being evaluated was only compared with earlier in time frames to generate a similarity feature for use with the classifier and the $L^1$ measure was used to calculate the similarity values. In addition, the kNN classifier was not utilized directly with the similarity value and temporal smoothing of the classification outputs was required.

SUMMARY OF THE INVENTION

Media segmentation is an increasingly important problem. For example, numerous video retrieval and management tasks rely on accurate segmentation of scene boundaries.

The present invention has been made in view of the above circumstances and provides a method for analyzing data to determine segment boundaries based on combining similarity analysis and supervised classification. The approach can be applied to segmentation of any ordered media, including text, audio streams, or video. It can also be used for cross-media analysis in which heterogeneous features are combined, such as low-level video features and textual features extracted from an accompanying transcript. In general in each of these forms of media the data streams are made up of ordered data subsets. A data subset is an element of a partitioning of the stream of data. Each element of the stream of data may be contained in one or more data subsets, e.g. a video stream can be divided into data subsets corresponding to each video frame. Often the ordering of the data subsets is temporal.

Two distinct types of novel data subset-indexed feature vectors are detailed. One includes values across multiple temporal scales obtained from kernel functions of varying width. The other includes a variety of raw similarity scores between data subsets in a neighborhood of the subset in question. In addition, a novel use of a 'modified Chi squared' similarity measure is described to compute the initial pair-wise similarity values stored in the similarity matrix.

BRIEF DESCRIPTION OF THE DRAWINGS

Preferred embodiments of the present invention will be described in detail based on the following figures, wherein:

FIG. 3 illustrates kernels proposed for segment boundary detection where L=4, for (a) $K_{CS}$, (b) $K_{FS}$, (c) $K_{SS}$ and (d) $K_{DCS}$;

FIG. 4 illustrates generating the novelty score (v) by applying kernel correlation functions (shown here q=2, where L=2 and L=3 for a $K_{FS}$) on the similarity matrix (S);

The figures are more fully described in the Detailed Description of the Invention.

DETAILED DESCRIPTION OF THE INVENTION

Similarity Analysis

Matrix Embedding

In one embodiment of the invention, low-level features are computed to represent each data subset in the stream of data. Any feature parameterization for which inter-subset data similarity may be reliably quantified can be used. A measure of the similarity (or dissimilarity) (D) between subset histograms $X_i$ and $X_j$ can then be calculated for every pair of subset data 'i' and 'j' in the stream of data as shown in equation 1. A similarity matrix, S, as depicted in FIG. 2, stores the similarity values for all data subset pairs, where the $ij^{th}$ entry $S(i,j)$ of the matrix S is the measure of similarity between the 'i' subset and the 'j' subset according to equation 1.

$$S(i,j) = D(X_i, X_j) \qquad \text{equation 1}$$

Figure 1:
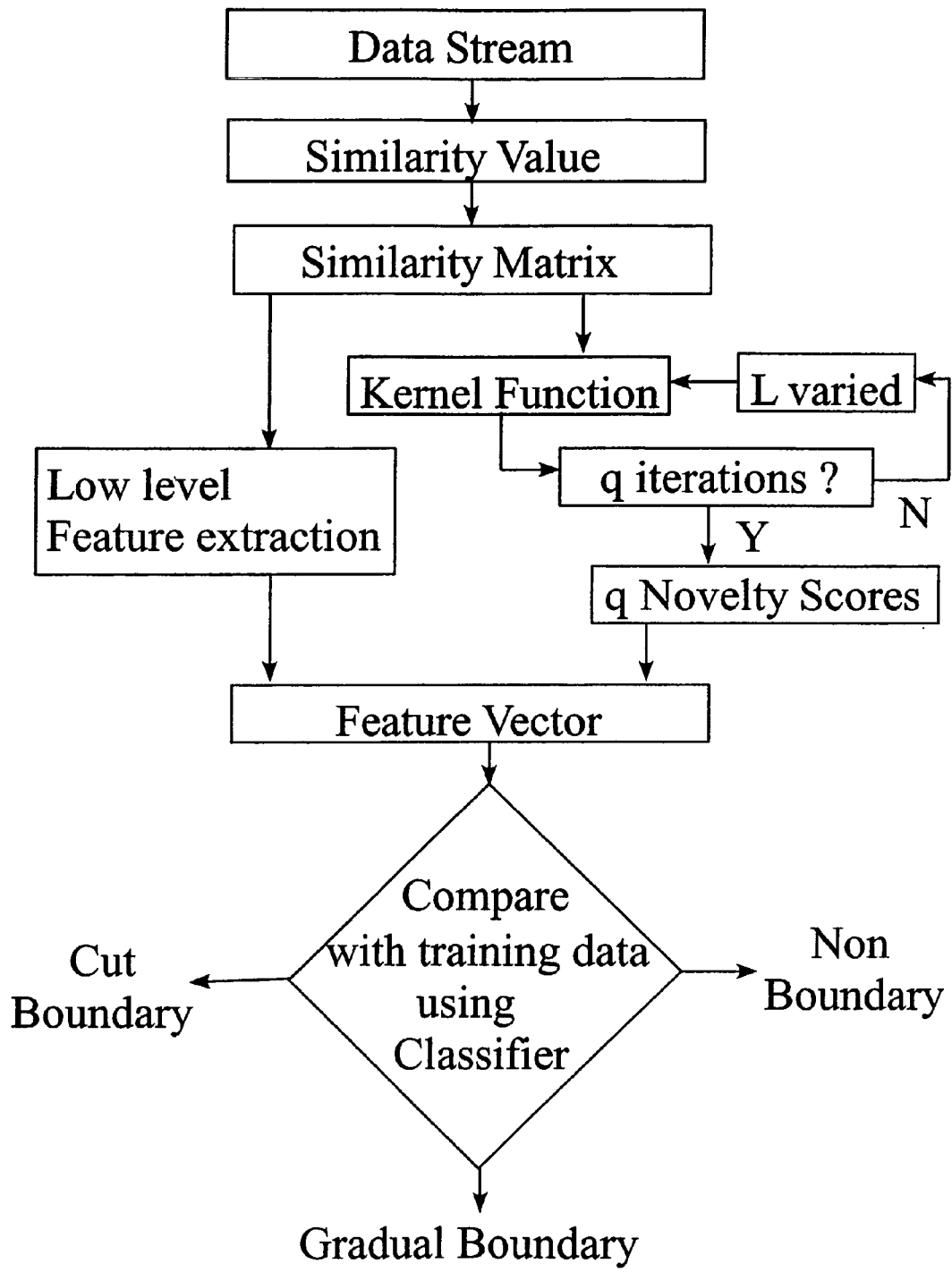
FIG. 1 illustrates a block diagram of the boundary detection invention for data streams in accordance with the present invention.
Figure 2:
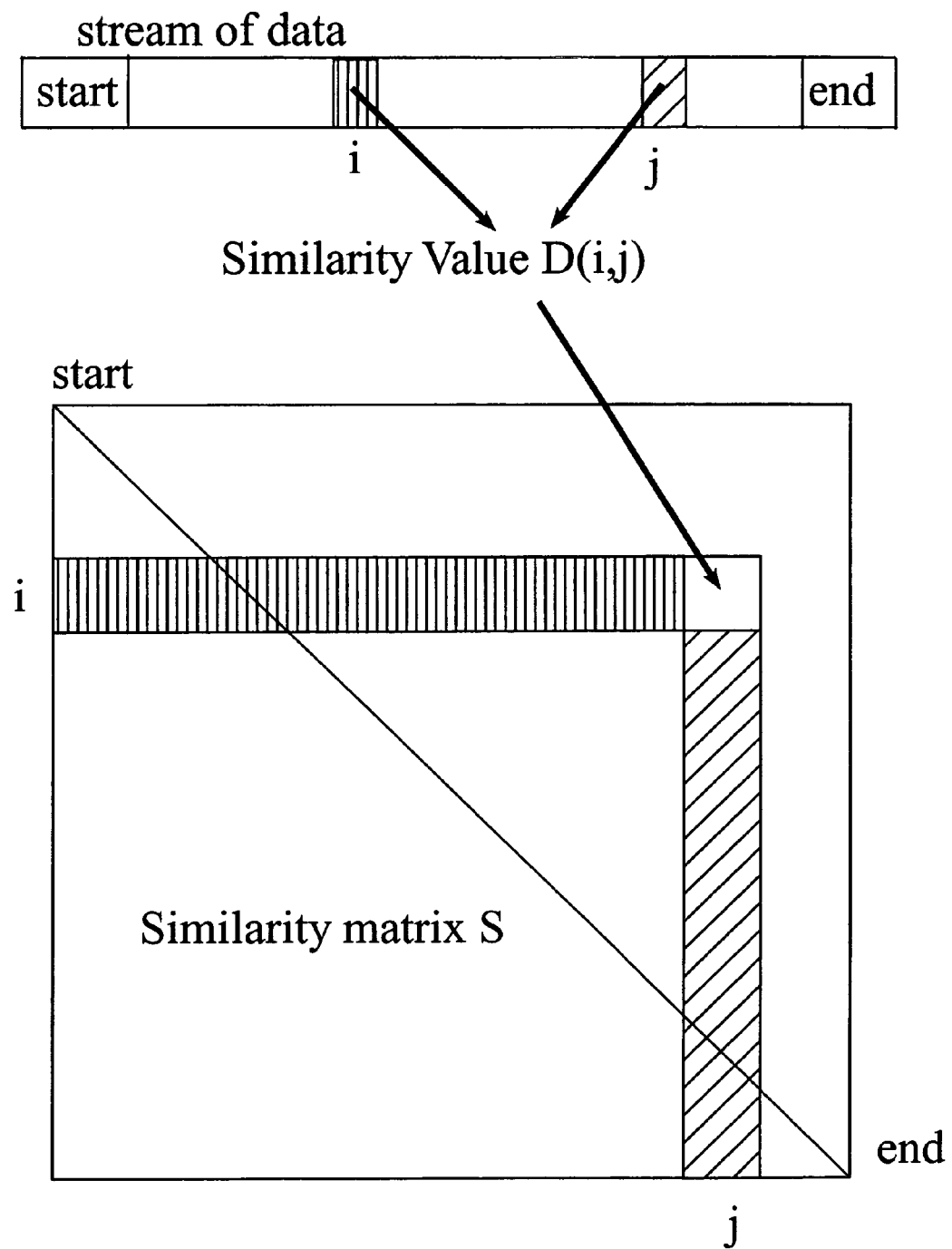
FIG. 2 illustrates the relationship between the subset element 'i' and the neighboring subset element 'j' in the stream of data and their location in the similarity matrix $S(i,j)$, where the low level features of each pair of subset elements are compared and stored.
Figure 5:
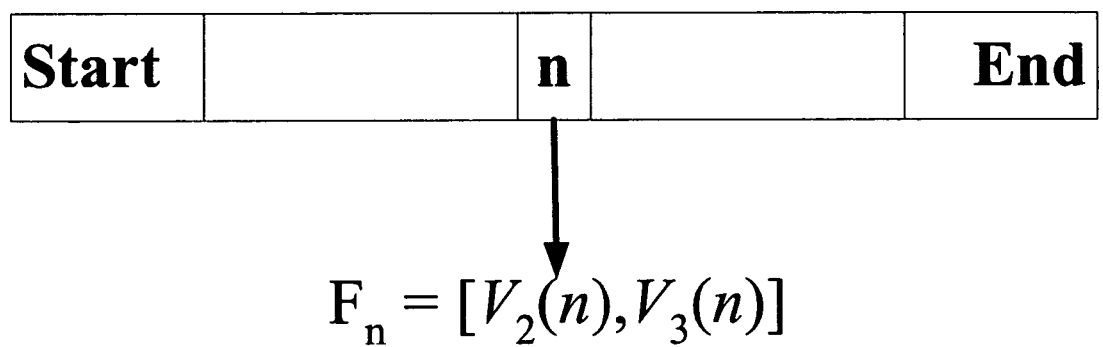
FIG. 5 illustrates the relationship between subset element 'n' and the feature vector for the $n^{th}$ element $F_n$.
Figure 6:
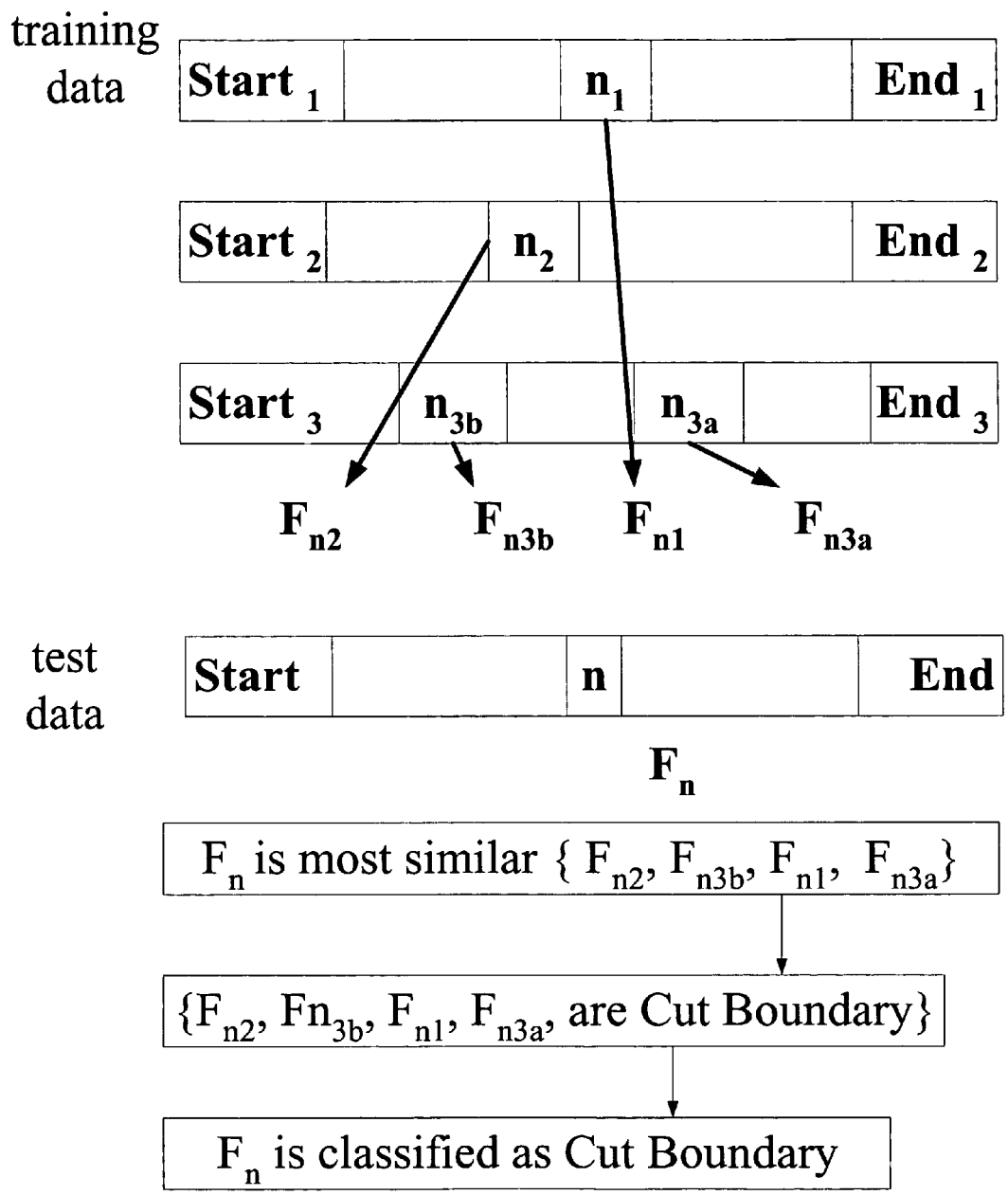
FIG. 6 illustrates how the classifier is used to compare the feature vector obtained from the test data with the feature vectors generated from the training data.

In FIG. 2, time runs along both axes as well as the diagonal. When the measure of similarity D is symmetric, S is also symmetric. The methods described can be used with a symmetric or an asymmetric measure of similarity.

Similarity Measures

Pairwise comparisons of similarity are computed between the extracted low-level histogram features, where $X_i$, $X_j$ are low-level features corresponding to the $i^{th}$ and $j^{th}$ respective data subsets of the stream of data. The comparisons can be based on difference, ratio, integral and derivative functions. Difference functions can be finite future and finite past. When the comparison is to a data subset which occurs earlier in time we refer to past difference. Future difference is when the comparison is to a data subset that occurs later in time. A number of difference measures of similarity are considered including: $L^1$, $L^2$, 'Chi squared' measure ($\chi^2$), 'modified Chi squared' measure ($M_{\chi}^2$). Definitions of those measures of dissimilarity include that given in equations 2-5. For all these measures, the similarity matrix S has minimum dissimilarity (zero) along the leading diagonal where each subset is compared to itself.

$$D_{L^1}(X_i, X_j) = \sum_{p=1}^{P} |X_i(p) - X_j(p)|. \qquad \text{equation 2}$$

$$D_{L^2}(X_i, X_j) = \sum_{p=1}^{P} \sqrt{(X_i(p) - X_j(p))^2}. \qquad \text{equation 3}$$

$$D_{\chi^2}(X_i, X_j) = \sum_{p=1}^{P} \frac{(X_i(p) - X_j(p))^2}{(X_i(p) + X_j(p))}. \qquad \text{equation 4}$$

$$D_{M_{\chi^2}}(X_i, X_j) = \sum_{p=1}^{P} \frac{(X_i(p) - X_j(p))^2}{(X_i(p) + X_j(p))^2}. \qquad \text{equation 5}$$

where P=the dimensionality of the low level features associated with each data subset.

Segmentation via Kernel Correlation

Generally, subsets within a coherent segment exhibit low dissimilarity, while subsets in adjacent coherent segments exhibit high dissimilarity. Ideally, the within-segment dissimilarity is zero, while the between segment dissimilarity is large. This produces a checkerboard pattern along the main diagonal of S. Thus locating such checkerboard patterns in S provides a reasonable segmentation method. In one embodiment of the invention, a correlation score matches regions of S to an ideal checkerboard kernel matrix, K. Specifically, the novelty score based on an L×L kernel K is defined by equation 6.

$$v(n) = \sum_{l=-L}^{L-1} \sum_{m=-L}^{L-1} K(l, m) S(n+l, n+m). \qquad \text{equation 6}$$

In one embodiment of the invention, the scale (L) of the kernel is altered from small values which tend to do better at finding boundaries between shorter segments, to large values which are better at finding boundaries between longer segments.

Calculating the entire similarity matrix S requires $N^2$ computations, where N is the number of data subsets. In practice, there is no reason to calculate similarity matrix values beyond the extent of the kernel, i.e. elements $S(i, j)$ where $|i-j|>L$. Additionally, because both S and K are typically symmetric, many computations are redundant. For this reason, with one embodiment of the invention the similarity matrix is computed only in a small portion of S near the main diagonal, and the data stored in the "lag domain" according to equation 7, $$S_{lag}(n,l) = S(n, n+l) \qquad \text{equation 7}$$

where $n=1, \ldots N$ and $l=1, \ldots L$ and $L \ll N$. Thus the algorithmic complexity is reduced to N.

Kernel Functions for Media Segmentation

The cross similarity kernel ($K_{CS}$) and three other previously described kernels (full similarity, $K_{FS}$, scale-space, $K_{SS}$ and diagonal cross similarity, $K_{DCS}$) are graphically depicted in FIG. 3. In each panel, a blank element does not contribute to the corresponding novelty score (i.e. $K(l,m)=0$ in equation 6). In FIG. 3, the elements containing solid circles contribute positively to the novelty score ($K(l,m)>0$). The elements containing unfilled circles contribute negatively to the novelty score ($K(l,m)<0$). For correlation, these kernels are applied along the main diagonal of S, as per equation 6.

The $K_{CS}$ is the matched filter for an ideal boundary segment boundary in the $L^1$ similarity matrix. The $K_{CS}$ (shown in FIG. 3(a) for L=4) is defined by equation 8.

$$K_{CS}(l, m) = \begin{cases} \frac{1}{2L^2} & \text{where} \quad l \geq 0 \text{ and } m < 0 \\ \frac{1}{2L^2} & \text{where} \quad m \geq 0 \text{ and } l < 0 \\ 0 & \text{otherwise.} \end{cases} \qquad \text{equation 8}$$

The $K_{FS}$ (shown in FIG. 3(b) for L=4), has previously been used in scene segmentation via kernel correlation. $K_{FS}$ includes both between-segment and within-segment terms. This kernel replaces the zero elements in $K_{CS}$ with negative weights. The negative weights penalize high within-segment dissimilarity, see equation 9.

$$K_{FS}(l, m) = \begin{cases} \frac{1}{2L^2} & \text{where} \quad l \geq 0 \text{ and } m < 0 \\ \frac{1}{2L^2} & \text{where} \quad m \geq 0 \text{ and } l < 0 \\ -\frac{1}{2L^2} & \text{otherwise.} \end{cases} \qquad \text{equation 9}$$

Feature Vectors

Kernel-Based Feature Vectors

In one embodiment of the invention "kernel-based" feature vectors are used to evaluate the data. A set of different scales L are considered. For each L in $\lambda$, a novelty score is calculated from the similarity matrix via a kernel of scale L. This process is iterated over $\lambda$. Each of these novelty scores is concatenated into a feature vector ($F_n$) whose different entries correspond to the q different values of L in $\lambda$. For example, let $\lambda=\{2, 3, 4, 5\}$, so $q=|\lambda|=4$. Then each data subset has an associated 4×1 feature vector that contains the q novelty scores. The feature vector associated with the $n^{th}$ subset is given by equation 10, $$F_n = [v_2(n), v_3(n), v_4(n), v_5(n)] \quad \text{equation 10}$$

where $v_L(n)$ denotes the novelty score computed using a kernel with width L for the $n^{th}$ data subset. This example illustrates an embodiment where r, the number of novelty scores in the feature vector, equals q the number of different scales L considered.

Raw Similarity Based Feature Vectors

In one embodiment of the invention feature vectors are directly derived from the "raw pairwise similarity" data. Instead of using a kernel to compute a single value for a data subset, entries are placed in the feature vector for each non-zero position in the kernel. For example, when using the $K_{CS}$ feature vector with L=5, the $n^{th}$ data subset is represented by the column vector shown in equation 11.

$$F_n = [S^{(G)}(n, n-4), \ldots S^{(G)}(n, n-1), S^{(G)}(n+1, n-4), \ldots \\ S^{(G)}(n+1, n-1), \ldots, S^{(G)}(n+2, n-4), \ldots S^{(G)}(n+2, \\ n-1), S^{(G)}(n+3, n-4), \ldots S^{(G)}(n+3, n-1)]^T \quad \text{equation 11.}$$

The raw similarity based feature vector typically increases the dimensionality of the feature vector, $F_n$, that is sent to a classifier, where $r=|F_n|$. The CS and FS kernels combine the advantages of the "row" kernel, the DCS, and the SS kernels. Specifically, the "row" kernel compares a current subset to past and future subsets. The DCS kernel compares past and future subsets to one another without the present subset. The SS kernel compares subsets in the present, past, and future to their immediate neighbors. The FS kernel directly combines all of this information by comparing all data subsets within L frames of the present subset. In this manner, the present subset is classified as a segment boundary based on a comprehensive local characterization of pairwise inter-subset similarity. The present subset is compared to past and future subsets directly. As well, the past and future subsets within a temporal distance L of the present subset are compared. Combining these features with supervised classification enables a more robust characterization of media segment boundaries, and enhanced performance in media segmentation.

In one embodiment of the invention the feature vector includes values obtained from more than one similarity matrix at a time. Alternatively, these similarity matrices could be embedded into a single similarity matrix of large dimension u. Thus in one embodiment a mixed audio visual data stream may be represented by two similarity matrices, one for the audio and one for the visual, where both contribute to a feature vector. Alternatively, in another embodiment both the audio and the visual similarity values would be entered into a u dimensional similarity matrix. In another embodiment using "kernel-based" feature vectors, novelty scores from more than one type of kernel contribute to the feature vector.

Using Classifiers for Media Segmentation

In one embodiment of the invention feature vectors are computed for each data subset in a set of training data. Then for each data subset in the test data, its feature vector is computed, and a supervised classifier is used to classify the data subset as cut-boundary or non-boundary. For example, using a kNN classifier, the k training subsets with feature vectors closest to the test data subset under consideration are selected. The subset is selected as a boundary if sufficiently many of these k nearest neighbors are boundaries. The sensitivity of the kNN classification is controlled using an integer parameter $\kappa: 1 \leq \kappa \leq k$. If at least $\kappa$ out of the k nearest neighbors of the vector $F_n$ in the training data are found to be boundaries, then the data subset 'n' is labeled as boundary or non-boundary respectively. In those embodiments of the invention shown in FIGS. 7-10, $\kappa$ is varied to produce the recall vs. precision curves. The same scheme can be used to distinguish among multiple types of boundaries. In one embodiment, the repeated application of a binary classifier is used to extend to the general case in which the number of classes exceeds two. Alternately, a single classifier can be trained to perform classification among more than two classes. In one embodiment of the invention, the classifier is trained on feature vectors associated with each training data subset and tested on feature vectors associated with each test data subset. It is also possible to use this method to distinguish different types of boundaries in addition to distinguishing between boundaries and non-boundaries. Two approaches are possible. In one, a multiway classifier is used to classify every subset as a non-boundary or as one of the types of boundaries. In the other approach, the method is repeatedly applied using a binary classifier each time, first distinguishing boundaries from non-boundaries, and then distinguishing one type of boundary from all the others, and repeating until all types of boundaries have been considered. We have used this method to distinguish between cut boundary frames, gradual boundary frames, and non-boundary frames in video.

Cut-Boundary Detection Experiments

In the following experiments the disclosed similarity based segmentation method is applied to determine the cut-boundary in video data streams as one embodiment of the invention. Each video frame is considered to be a data subset and histograms representative of the frame are extracted in the YUV color space. For each frame, a global YUV histogram and a block YUV histogram are extracted using a uniform 4×4 grid. Separate similarity matrices for the global histogram data, $S^{(G)}$ and for the block histogram data, $S^{(B)}$ are computed. Supervised binary kNN classification is employed to label each frame as either cut-boundary or non-boundary. This produces a consistent boundary detection scheme for comparing the various kernels. Frame-indexed data computed from $S^{(G)}$ and $S^{(B)}$ are concatenated to generate $F_n$ and used to train and test the kNN classifier to detect cut (abrupt) segment boundaries. For testing, the reported TRECVID 2002 test data and evaluation software for the shot boundary detection task was utilized. TRECVID is a large-scale metric-based evaluation providing standard data used to compare various systems in video analysis. From TRECVID 2002, the average recall, defined in equation 12, and precision, defined in equation 13, for cut-detection was found to be 0.86 and 0.84, respectively. The test set is made up of almost 6 hours of video and 1466 cut-transitions, per the manual ground truth. For the kNN training, cross-validation was used and separate classifiers were trained for each video using the remaining videos in the test set. The results are combined for the entire test set. Throughout, k=11.

recall=# correct called boundary segments/(correct+ missed)      equation 12.

precision=# correct called boundary segments/(correct+incorrectly)      equation 13.

Kernel-Based Feature Vectors

Novelty features for shot boundary detection with q=4 corresponding to kernels of extent L=2, 3, 4, 5 were used. For each L, a frame-indexed kernel correlation was separately calculated using $S^{(G)}$ and $S^{(B)}$ as in equation 6. For these experiments, we compute $S^{(G)}$ and $S^{(B)}$ using the similarity measure of equation 2. These novelty scores were concatenated, resulting in four novelty scores for each video frame for both the global and the block histogram features. This data was combined into a single 8×1 feature vector to represent each video frame 'n' as in equation 14. This example illustrates an embodiment where r, the number of novelty scores concatenated into the feature vector, exceeds q; here r is twice q.

$$F_n = [v_2^{(G)}(n), v_3^{(G)}(n), v_4^{(G)}(n), v_5^{(G)}(n), v_2^{(B)}(n), v_3^{(B)}(n), v_4^{(B)}(n), v_5^{(B)}(n)]^T \quad \text{equation 14}$$

where $v_L^{(G)}$ denotes the novelty score computed using $S^{(G)}$ with kernel width L, and $v_L^{(B)}$ denotes the novelty score computed using S(B) with kernel width L. In this embodiment of the invention the input data, $\{F_n : n=1, \ldots, N\}$, is used with "ground truth" class labeling to train the kNN classifier.

Figure 7:
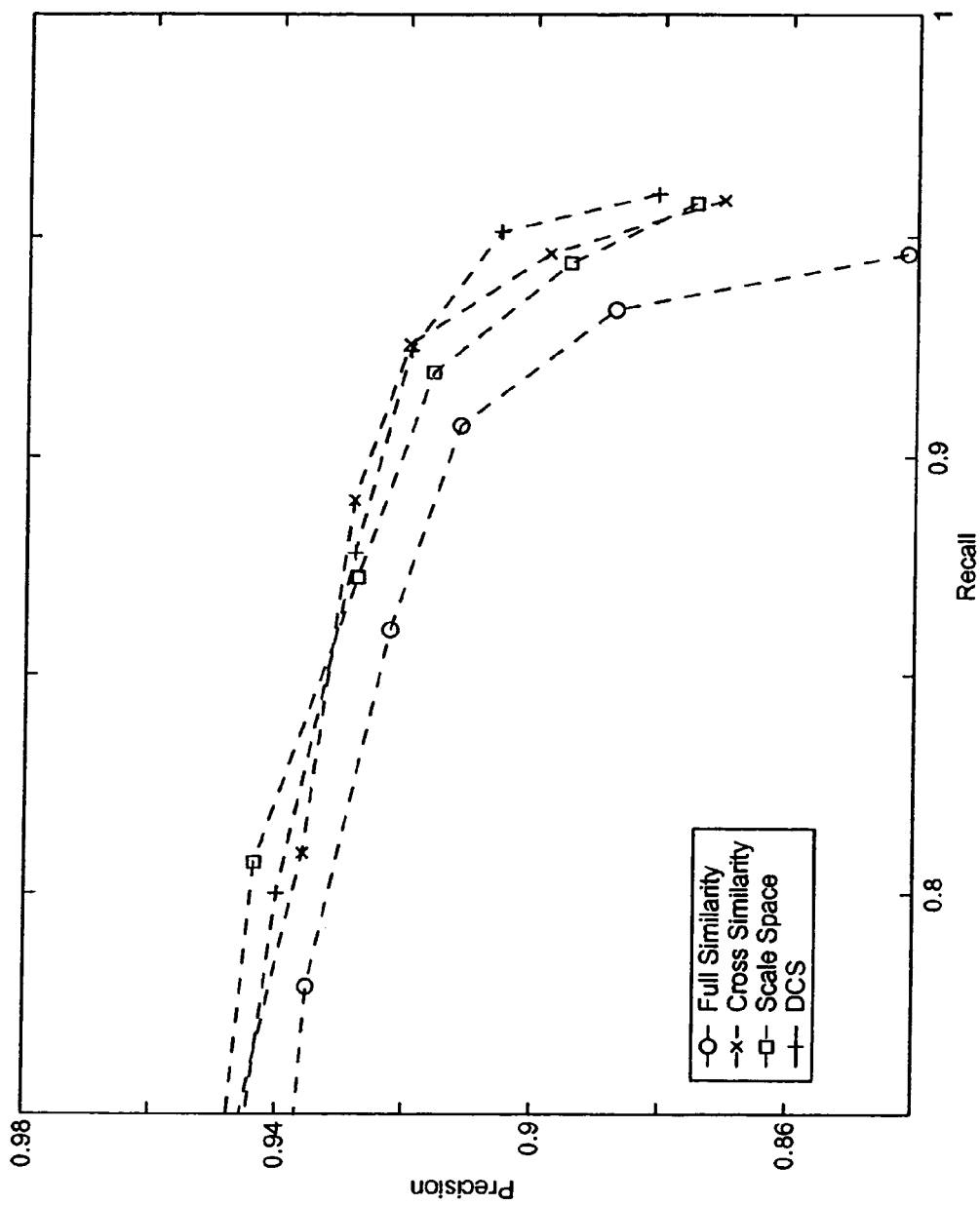
FIG. 7 illustrates the precision versus the recall for kernel-based feature functions with different kernel correlation functions, where (x) denotes the $K_{CS}$, (o) the $K_{FS}$, (□) the $K_{SS}$ and (+) the $K_{DCS}$.

FIG. 7 shows the recall and precision values for $K_{FS}$ (○), the $K_{CS}$ ("x"), the $K_{SS}$ ("□"), and the $K_{DCS}$ ("+"). The best performance is achieved by the $K_{CS}$ and the $K_{DCS}$. As noted above, the $K_{CS}$ is the matched filter for the expected pattern produced by segment boundaries in S. Both the $K_{CS}$ and $K_{DCS}$ emphasize dissimilarity between the segments evident at multiple time scales. The $K_{FS}$ performs worst, due to the choice of the Euclidean dissimilarity measure. The $K_{FS}$ is better suited to dissimilarity measures that take positive and negative values such as the cosine similarity measure.

Raw Similarity Based Feature Vectors

In a separate experiment, the performance using the raw pairwise similarity data as input to the kNN classifier was examined. In this embodiment of the invention two similarity matrices $S^{(G)}$ and $S^{(B)}$ are used to form $F_n$. For each kernel, the input feature vectors were constructed from those elements of $S^{(G)}$ and $S^{(B)}$ that contribute to the corresponding novelty score, where L=5. For example, for the CS features, the $n^{th}$ frame is represented by the column vector shown in equation 15.

$$F_n = [S^{(G)}(n, n-4), \ldots S^{(G)}(n, n-1), S^{(G)}(n+1, n-4), \quad \text{equation 15}$$
$$\ldots S^{(G)}(n+1, n-1), \ldots S^{(G)}(n+2, n-4),$$
$$\ldots S^{(G)}(n+2, n-1), S^{(G)}(n+3, n-4),$$
$$\ldots S^{(G)}(n+3, n-1), \ldots S^{(B)}(n, n-4), \ldots S^{(B)}(n, n-1),$$
$$S^{(B)}(n+1, n-4), \ldots S^{(B)}(n+1, n-1),$$
$$\ldots S^{(B)}(n+2, n-4), \ldots S^{(B)}(n+2, n-1),$$
$$S^{(B)}(n+3, n-4), \ldots S^{(B)}(n+3, n-1)]^T.$$

Figure 8:
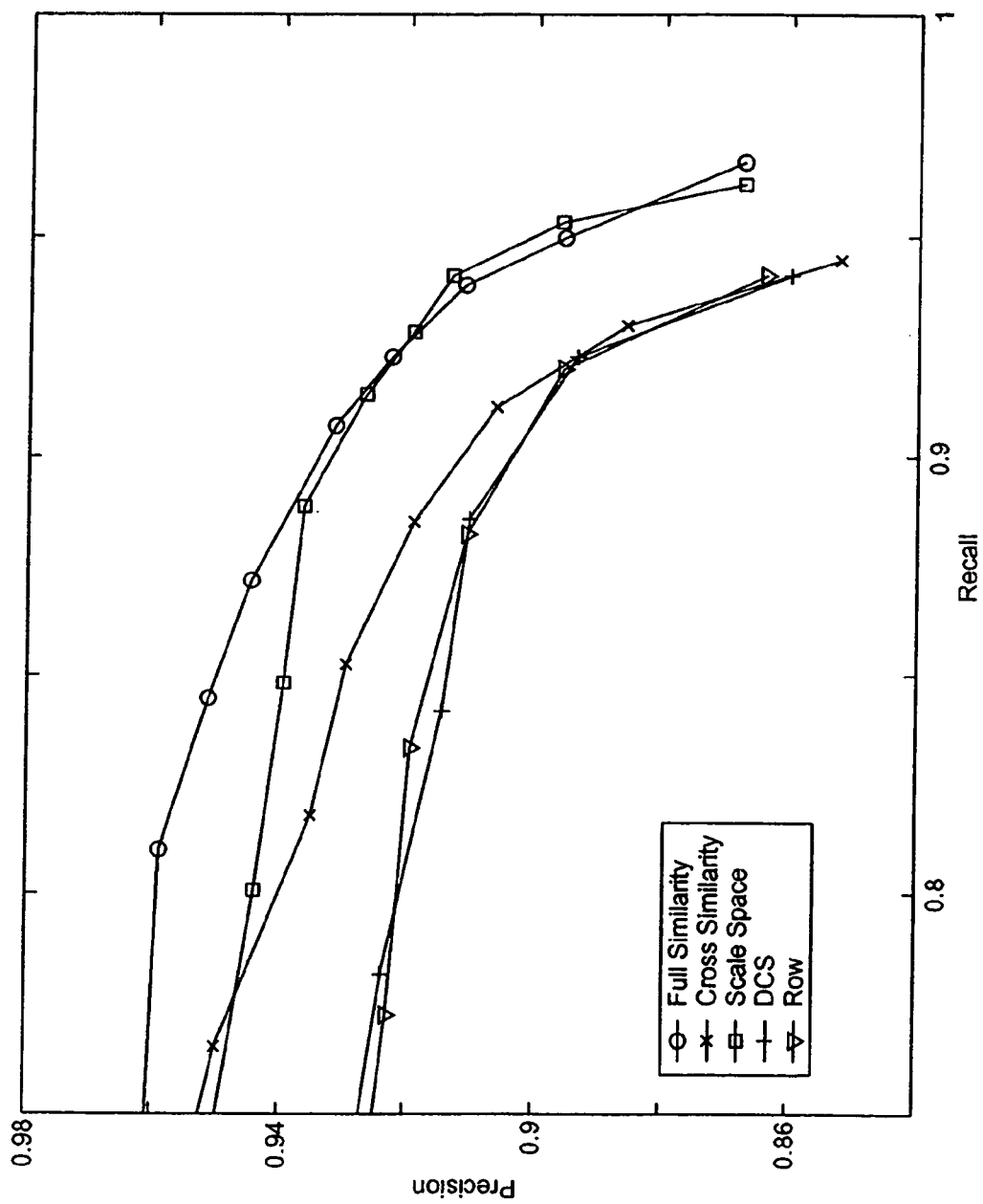
FIG. 8 illustrates the precision versus the recall for raw similarity based feature vectors with different kernel correlation functions, where (x) denotes the $K_{CS}$, (o) the $K_{FS}$, (□) the $K_{SS}$, (+) the $K_{DCS}$ and (Δ) the $K_{ROW}$.

The results appear in FIG. 8. In this case, the additional similarity information included in the FS data improves performance. The SS approach, however, outperforms the CS features. This result is not surprising since cut-detection performance relies largely on first order (adjacent frame) similarity, which is not emphasized by either the CS or DCS features. FIG. 8 also compares the performance for the "row" features kernel ($K_{ROW}$), which has been previously proposed, where each frame n is represented by the 2L×1 vector as shown in equation 16.

$$F_n = [S^{(G)}(n, n-1), S^{(G)}(n, n-2), \ldots S^{(G)}(n, n-L), \ldots S^{(B)}(n, n-1), S^{(B)}(n, n-2), \ldots S^{(B)}(n, n-L)]^T \quad \text{equation 16.}$$

All the approaches perform at a high level as input to the kNN classifier. Comparing FIGS. 7 and 8, the similarity-based features produce superior performance for cut-boundary detection. Furthermore, among the similarity-based features, the FS data provides the best results and is a substantial improvement over the row-based features previously employed.

Similarity Measures

Figure 9:
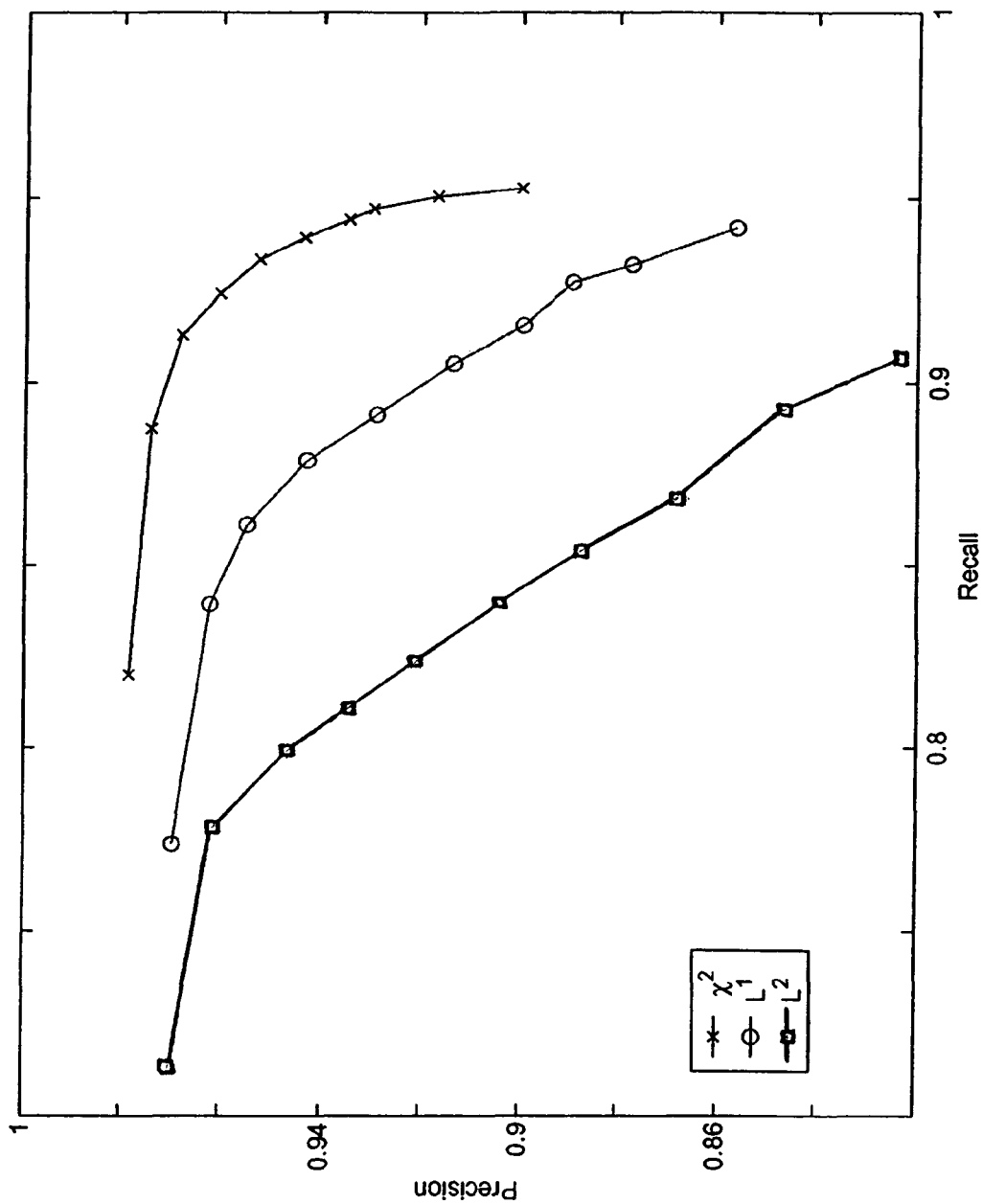
FIG. 9 illustrates the precision versus the recall for raw similarity based feature vectors with the $K_{FS}$ and different similarity measures are used to generate the similarity matrix, where (x) denotes the $D_{M_x}2$, (o) the $D_L 1$ and (□) the $D_L 2$.
Figure 10:
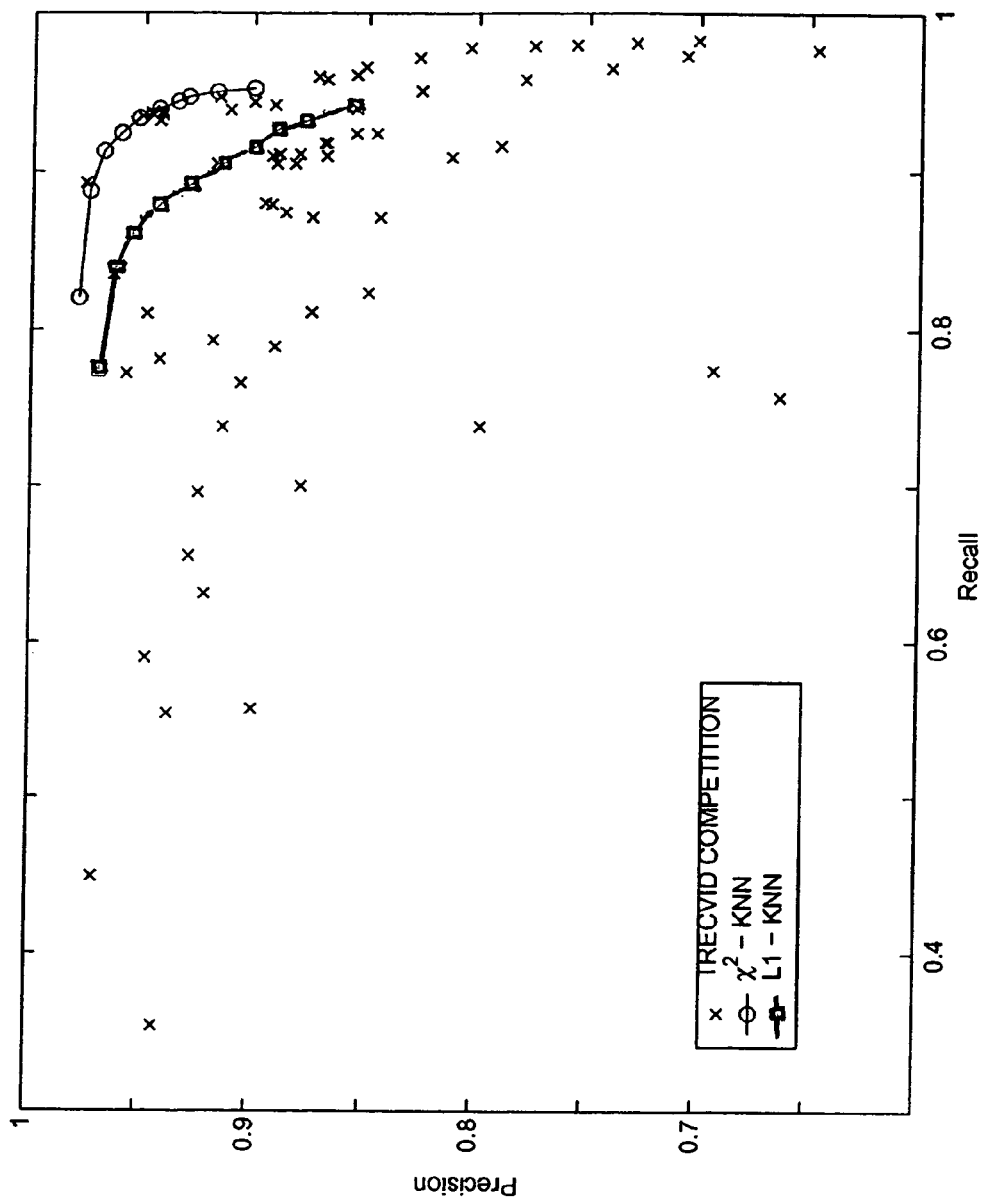
FIG. 10 illustrates the precision versus the recall for raw similarity based feature vectors with the $K_{FS}$ and different similarity measures being used to generate the similarity matrix, where (x) denotes the TRECVID competition, (o) the $D_{M_x}2$ and (o) the $D_L 1$. The kNN classifier was used with the $D_{M_x}2$ and the $D_L 1$ similarity measures.

In a separate experiment different similarity measures are compared. FIG. 9 shows performance for cut-detection using the TRECVID 2003 test set. In this embodiment of the invention the raw FS features were used to generate the feature vector with L=5. Each curve corresponds to a different choice of the similarity measure. The result using the $L^1$ measure of equation 2 are denoted as (○). The curve denoted as (x) uses the $M_\chi^2$ measure given in equation 5. The curve denoted as (□) corresponds to the $L^2$ measure of equation 3. The plot shows a marked performance improvement associated with the use of $D_{M_\chi}2$. Additionally, the $D_L 1$ measure outperforms the $D_L^2$ measure. FIG. 10 shows performance using $D_L 1$ and $D_{M_\chi}^2$ measures in a plot with other points form the 2003 TRECVID competition. Both curves perform at a high level relative to the other groups who participated in this competition.

A method for determining the location of a segment boundary in a stream of data comprising determining one or more similarity values by comparing a data subset within the stream of data with one or more data subsets selected from a group of present and future data subsets, where the future data subset occurs later in time than the data subset in the stream of data and the present data subset occurs at the same time as the data subset in the stream of data, and classifying one or more sets of similarity values to determine the segment boundary.

A method for determining the location of a segment boundary in a stream of data comprising determining one or more similarity values by comparing a data subset within the stream of data with one or more data subsets selected from a group of present and future data subsets, where the future data subset occurs later in time than the data subset in the stream of data and the present data subset occurs at the same time as the data subset in the stream of data, and classifying one or more sets of similarity values to determine the segment boundary, wherein determining the segment boundary further comprises determining one or more similarity values by comparing the data subset within the stream of data with one or more data subsets selected from a group of past data subsets, where the past data subset occurs earlier in time than the data subset in the stream of data, producing a feature vector from the similarity values which includes at least one similarity value of the data subset compared with the future data subset, and classifying the feature vector to determine the segment boundary.

A method for determining the location of a segment boundary in a stream of data comprising determining one or more similarity values by comparing a data subset within the stream of data with one or more data subsets selected from a group of present and future data subsets, where the future data subset occurs later in time than the data subset in the stream of data and the present data subset occurs at the same time as the data subset in the stream of data, further comprising the data subsets being compared are separated by an offset, where the offset is varied between 0 and a maximum offset L, and the comparison is carried out at one or more of the varied offsets and classifying one or more sets of similarity values to determine the segment boundary, wherein determining the segment boundary further comprises determining one or more similarity values by comparing the data subset within the stream of data with one or more data subsets selected from a group of past data subsets, where the past data subset occurs earlier in time than the data subset in the stream of data, further comprising the data subsets being compared are separated by an offset, where the offset is varied between 0 and a maximum offset L, and the comparison is carried out at one or more of the varied offsets, producing a feature vector from the similarity values which includes at least one similarity value of the data subset compared with the future data subset, and classifying the feature vector to determine the segment boundary.

A method for determining the location of a segment boundary in a stream of data comprising determining one or more similarity values by comparing a data subset within the stream of data with one or more data subsets selected from a group of present and future data subsets, where the future data subset occurs later in time than the data subset in the stream of data and the present data subset occurs at the same time as the data subset in the stream of data, further comprising the data subsets being compared are separated by an offset, where the offset is varied between 0 and a maximum offset L, and the comparison is carried out at one or more of the varied offsets and determining one or more similarity values by comparing past and future data subsets within L data subsets from the data subset within the stream of data with one or more data subsets selected from a group of past and future data subsets, and producing a feature vector from the similarity values of the data subset and the similarity values of past and future data subsets and classifying one or more sets of similarity values to determine the segment boundary, wherein determining the segment boundary further comprises determining one or more similarity values by comparing the data subset within the stream of data with one or more data subsets selected from a group of past data subsets, where the past data subset occurs earlier in time than the data subset in the stream of data, further comprising the data subsets being compared are separated by an offset, where the offset is varied between 0 and a maximum offset L, and the comparison is carried out at one or more of the varied offsets and determining one or more similarity values by comparing past and future data subsets within L data subsets from the data subset within the stream of data with one or more data subsets selected from a group of past and future data subsets, and producing a feature vector from the similarity values of the data subset and the similarity values of past and future data subsets, producing a feature vector from the similarity values which includes at least one similarity value of the data subset compared with the future data subset, further comprising determining one or more similarity values by comparing past and future data subsets within L data subsets from the data subset within the stream of data with one or more data subsets selected from a group of past and future data subsets, and producing a feature vector from the similarity values of the data subset and the similarity values of past and future data subsets, and classifying the feature vector to determine the segment boundary.

A method for determining the location of a segment boundary in a stream of data comprising determining one or more similarity values by comparing a data subset within the stream of data with one or more data subsets selected from a group of present and future data subsets, where the future data subset occurs later in time than the data subset in the stream of data and the present data subset occurs at the same time as the data subset in the stream of data, further comprising the data subsets being compared are separated by an offset, where the offset is varied between 0 and a maximum offset L, and the comparison is carried out at one or more of the varied offsets and determining one or more similarity values by comparing past and future data subsets within L data subsets from the data subset within the stream of data with one or more data subsets selected from a group of past and future data subsets, and producing a feature vector from the similarity values of the data subset and the similarity values of past and future data subsets and classifying one or more sets of similarity values to determine the segment boundary, wherein determining the segment boundary further comprises determining one or more similarity values by comparing the data subset within the stream of data with one or more data subsets selected from a group of past data subsets, where the past data subset occurs earlier in time than the data subset in the stream of data, further comprising the data subsets being compared are separated by an offset, where the offset is varied between 0 and a maximum offset L, and the comparison is carried out at one or more of the varied offsets and determining one or more similarity values by comparing past and future data subsets within L data subsets from the data subset within the stream of data with one or more data subsets selected from a group of past and future data subsets, and producing a feature vector from the similarity values of the data subset and the similarity values of past and future data subsets, producing a feature vector from the similarity values which includes at least one similarity value of the data subset compared with the future data subset, further comprising determining one or more similarity values by comparing past and future data subsets within L data subsets from the data subset within the stream of data with one or more data subsets selected from a group of past and future data subsets, and producing a feature vector from the similarity values of the data subset and the similarity values of past and future data subsets, and classifying the feature vector to determine the segment boundary, further comprising training one or more classifiers based on one or more feature vectors derived from one or more sets of training data and a ground truth, and classifying the feature vector from the data subset based on one or more trained classifiers as boundary and non-boundary.

A method for determining the location of a segment boundary in a stream of data comprising determining one or more similarity values by comparing a data subset within the stream of data with one or more data subsets selected from a group of present and future data subsets, where the future data subset occurs later in time than the data subset in the stream of data and the present data subset occurs at the same time as the data subset in the stream of data, further comprising the data subsets being compared are separated by an offset, where the offset is varied between 0 and a maximum offset L, and the comparison is carried out at one or more of the varied offsets and determining one or more similarity values by comparing past and future data subsets within L data subsets from the data subset within the stream of data with one or more data subsets selected from a group of past and future data subsets, and producing a feature vector from the similarity values of the data subset and the similarity values of past and future data subsets and classifying one or more sets of similarity values to determine the segment boundary, wherein determining the segment boundary further comprises determining one or more similarity values by comparing the data subset within the stream of data with one or more data subsets selected from a group of past data subsets, where the past data subset occurs earlier in time than the data subset in the stream of data, further comprising the data subsets being compared are separated by an offset, where the offset is varied between 0 and a maximum offset L, and the comparison is carried out at one or more of the varied offsets and determining one or more similarity values by comparing past and future data subsets within L data subsets from the data subset within the stream of data with one or more data subsets selected from a group of past and future data subsets, and producing a feature vector from the similarity values of the data subset and the similarity values of past and future data subsets, producing a feature vector from the similarity values which includes at least one similarity value of the data subset compared with the future data subset, further comprising determining one or more similarity values by comparing past and future data subsets within L data subsets from the data subset within the stream of data with one or more data subsets selected from a group of past and future data subsets, and producing a feature vector from the similarity values of the data subset and the similarity values of past and future data subsets, where similarity values of comparisons between the data subset and future data subsets contribute positively to the feature vector while similarity values of comparisons between the data subset and past data subsets do not contribute positively to the feature vector, and classifying the feature vector to determine the segment boundary.

A method for determining the location of a segment boundary in a stream of data comprising determining one or more similarity values by comparing a data subset within the stream of data with one or more data subsets selected from a group of present and future data subsets, where the future data subset occurs later in time than the data subset in the stream of data and the present data subset occurs at the same time as the data subset in the stream of data, further comprising the data subsets being compared are separated by an offset, where the offset is varied between 0 and a maximum offset L, and the comparison is carried out at one or more of the varied offsets and determining one or more similarity values by comparing past and future data subsets within L data subsets from the data subset within the stream of data with one or more data subsets selected from a group of past and future data subsets, and producing a feature vector from the similarity values of the data subset and the similarity values of past and future data subsets and classifying one or more sets of similarity values to determine the segment boundary, wherein determining the segment boundary further comprises determining one or more similarity values by comparing the data subset within the stream of data with one or more data subsets selected from a group of past data subsets, where the past data subset occurs earlier in time than the data subset in the stream of data, further comprising the data subsets being compared are separated by an offset, where the offset is varied between 0 and a maximum offset L, and the comparison is carried out at one or more of the varied offsets and determining one or more similarity values by comparing past and future data subsets within L data subsets from the data subset within the stream of data with one or more data subsets selected from a group of past and future data subsets, and producing a feature vector from the similarity values of the data subset and the similarity values of past and future data subsets, producing a feature vector from the similarity values which includes at least one similarity value of the data subset compared with the future data subset, further comprising determining one or more similarity values by comparing past and future data subsets within L data subsets from the data subset within the stream of data with one or more data subsets selected from a group of past and future data subsets, and producing a feature vector from the similarity values of the data subset and the similarity values of past and future data subsets, and classifying the feature vector to determine the segment boundary, wherein classifying the feature vector further comprises storing the similarity values in one or more similarity matrix, and applying one or more kernel functions to the similarity matrix where the kernel functions have different extent L thereby extracting different similarity values from the similarity matrix.

A method for determining the location of a segment boundary in a stream of data comprising determining one or more similarity values by comparing a data subset within the stream of data with one or more data subsets selected from a group of present and future data subsets, where the future data subset occurs later in time than the data subset in the stream of data and the present data subset occurs at the same time as the data subset in the stream of data, further comprising the data subsets being compared are separated by an offset, where the offset is varied between 0 and a maximum offset L, and the comparison is carried out at one or more of the varied offsets and determining one or more similarity values by comparing past and future data subsets within L data subsets from the data subset within the stream of data with one or more data subsets selected from a group of past and future data subsets, and producing a feature vector from the similarity values of the data subset and the similarity values of past and future data subsets and classifying one or more sets of similarity values to determine the segment boundary, wherein determining the segment boundary further comprises determining one or more similarity values by comparing the data subset within the stream of data with one or more data subsets selected from a group of past data subsets, where the past data subset occurs earlier in time than the data subset in the stream of data, further comprising the data subsets being compared are separated by an offset, where the offset is varied between 0 and a maximum offset L, and the comparison is carried out at one or more of the varied offsets and determining one or more similarity values by comparing past and future data subsets within L data subsets from the data subset within the stream of data with one or more data subsets selected from a group of past and future data subsets, and producing a feature vector from the similarity values of the data subset and the similarity values of past and future data subsets, producing a feature vector from the similarity values which includes at least one similarity value of the data subset compared with the future data subset, further comprising determining one or more similarity values by comparing past and future data subsets within L data subsets from the data subset within the stream of data with one or more data subsets selected from a group of past and future data subsets, and producing a feature vector from the similarity values of the data subset and the similarity values of past and future data subsets, and classifying the feature vector to determine the segment boundary, wherein classifying the feature vector further comprises storing the similarity values in one or more similarity matrix, and applying one or more kernel functions to the similarity matrix where the kernel functions have different extent L thereby extracting different similarity values from the similarity matrix, wherein a novelty score is generated for q different values of L, so that q novelty scores are generated by applying q kernel functions of different extent L to the similarity matrix.

A method for determining the location of a segment boundary in a stream of data comprising determining one or more similarity values by comparing a data subset within the stream of data with one or more data subsets selected from a group of present and future data subsets, where the future data subset occurs later in time than the data subset in the stream of data and the present data subset occurs at the same time as the data subset in the stream of data, further comprising the data subsets being compared are separated by an offset, where the offset is varied between 0 and a maximum offset L, and the comparison is carried out at one or more of the varied offsets and determining one or more similarity values by comparing past and future data subsets within L data subsets from the data subset within the stream of data with one or more data subsets selected from a group of past and future data subsets, and producing a feature vector from the similarity values of the data subset and the similarity values of past and future data subsets and classifying one or more sets of similarity values to determine the segment boundary, wherein determining the segment boundary further comprises determining one or more similarity values by comparing the data subset within the stream of data with one or more data subsets selected from a group of past data subsets, where the past data subset occurs earlier in time than the data subset in the stream of data, further comprising the data subsets being compared are separated by an offset, where the offset is varied between 0 and a maximum offset L, and the comparison is carried out at one or more of the varied offsets and determining one or more similarity values by comparing past and future data subsets within L data subsets from the data subset within the stream of data with one or more data subsets selected from a group of past and future data subsets, and producing a feature vector from the similarity values of the data subset and the similarity values of past and future data subsets, producing a feature vector from the similarity values which includes at least one similarity value of the data subset compared with the future data subset, further comprising determining one or more similarity values by comparing past and future data subsets within L data subsets from the data subset within the stream of data with one or more data subsets selected from a group of past and future data subsets, and producing a feature vector from the similarity values of the data subset and the similarity values of past and future data subsets, and classifying the feature vector to determine the segment boundary, wherein classifying the feature vector further comprises storing the similarity values in one or more similarity matrix, and applying one or more kernel functions to the similarity matrix where the kernel functions have different extent L thereby extracting different similarity values from the similarity matrix, wherein a novelty score is generated for q different values of L, so that q novelty scores are generated by applying q kernel functions of different extent L to the similarity matrix, where the feature vector is produced by concatenating the q novelty scores.

A method for determining the location of a segment boundary in a stream of data comprising determining one or more similarity values by comparing a data subset within the stream of data with one or more data subsets selected from a group of present and future data subsets, where the future data subset occurs later in time than the data subset in the stream of data and the present data subset occurs at the same time as the data subset in the stream of data, further comprising the data subsets being compared are separated by an offset, where the offset is varied between 0 and a maximum offset L, and the comparison is carried out at one or more of the varied offsets and determining one or more similarity values by comparing past and future data subsets within L data subsets from the data subset within the stream of data with one or more data subsets selected from a group of past and future data subsets, and producing a feature vector from the similarity values of the data subset and the similarity values of past and future data subsets and classifying one or more sets of similarity values to determine the segment boundary, wherein determining the segment boundary further comprises determining one or more similarity values by comparing the data subset within the stream of data with one or more data subsets selected from a group of past data subsets, where the past data subset occurs earlier in time than the data subset in the stream of data, further comprising the data subsets being compared are separated by an offset, where the offset is varied between 0 and a maximum offset L, and the comparison is carried out at one or more of the varied offsets and determining one or more similarity values by comparing past and future data subsets within L data subsets from the data subset within the stream of data with one or more data subsets selected from a group of past and future data subsets, and producing a feature vector from the similarity values of the data subset and the similarity values of past and future data subsets, producing a feature vector from the similarity values which includes at least one similarity value of the data subset compared with the future data subset, further comprising determining one or more similarity values by comparing past and future data subsets within L data subsets from the data subset within the stream of data with one or more data subsets selected from a group of past and future data subsets, and producing a feature vector from the similarity values of the data subset and the similarity values of past and future data subsets, and classifying the feature vector to determine the segment boundary, wherein classifying the feature vector further comprises storing the similarity values in one or more similarity matrix, and applying one or more kernel functions to the similarity matrix where the kernel functions have different extent L thereby extracting different similarity values from the similarity matrix, where the feature vector is produced by extracting the raw pairwise data of the similarity matrices for each non-zero value in the kernel function.

A method for determining the location of a segment boundary in a stream of data comprising determining one or more similarity values by comparing a data subset within the stream of data with one or more data subsets selected from a group of present and future data subsets, where the future data subset occurs later in time than the data subset in the stream of data and the present data subset occurs at the same time as the data subset in the stream of data, further comprising the data subsets being compared are separated by an offset, where the offset is varied between 0 and a maximum offset L, and the comparison is carried out at one or more of the varied offsets and determining one or more similarity values by comparing past and future data subsets within L data subsets from the data subset within the stream of data with one or more data subsets selected from a group of past and future data subsets, and producing a feature vector from the similarity values of the data subset and the similarity values of past and future data subsets, generating one or more low level features of past, future and present data subsets, and the similarity value is calculated from the pairwise comparison of the low level features by a measure selected from the group of 'modified Chi squared' measure, 'Chi squared' measure, L1 and L2; where L1 is the sum of the modulai of the difference between the low level features of the data subset and the low level features of the past, future and present data subset and L2 is the sum of the square root of the square of the difference between the low level features of the data subset and the low level features of the past, future and present data subset, and classifying one or more sets of similarity values to determine the segment boundary, wherein determining the segment boundary further comprises determining one or more similarity values by comparing the data subset within the stream of data with one or more data subsets selected from a group of past data subsets, where the past data subset occurs earlier in time than the data subset in the stream of data, further comprising the data subsets being compared are separated by an offset, where the offset is varied between 0 and a maximum offset L, and the comparison is carried out at one or more of the varied offsets and determining one or more similarity values by comparing past and future data subsets within L data subsets from the data subset within the stream of data with one or more data subsets selected from a group of past and future data subsets, and producing a feature vector from the similarity values of the data subset and the similarity values of past and future data subsets, producing a feature vector from the similarity values which includes at least one similarity value of the data subset compared with the future data subset, further comprising determining one or more similarity values by comparing past and future data subsets within L data subsets from the data subset within the stream of data with one or more data subsets selected from a group of past and future data subsets, and producing a feature vector from the similarity values of the data subset and the similarity values of past and future data subsets, and classifying the feature vector to determine the segment boundary.

A method for determining the location of a segment boundary in a stream of data comprising determining one or more similarity values by comparing a data subset within the stream of data with one or more data subsets selected from a group of present and future data subsets, where the future data subset occurs later in time than the data subset in the stream of data and the present data subset occurs at the same time as the data subset in the stream of data, further comprising the data subsets being compared are separated by an offset, where the offset is varied between 0 and a maximum offset L, and the comparison is carried out at one or more of the varied offsets and determining one or more similarity values by comparing past and future data subsets within L data subsets from the data subset within the stream of data with one or more data subsets selected from a group of past and future data subsets, generating one or more low level features of past, future and present data subsets, and the similarity value is calculated from the pairwise comparison of the low level features by a measure selected from the group of 'modified Chi squared' measure, 'Chi squared' measure, L1 and L2; where L1 is the sum of the modulai of the difference between the low level features of the data subset and the low level features of the past, future and present data subset and L2 is the sum of the square root of the square of the difference between the low level features of the data subset and the low level features of the past, future and present data subset, and producing a feature vector from the similarity values of the data subset and the similarity values of past and future data subsets and classifying one or more sets of similarity values to determine the segment boundary, wherein determining the segment boundary further comprises determining one or more similarity values by comparing the data subset within the stream of data with one or more data subsets selected from a group of past data subsets, where the past data subset occurs earlier in time than the data subset in the stream of data, further comprising the data subsets being compared are separated by an offset, where the offset is varied between 0 and a maximum offset L, and the comparison is carried out at one or more of the varied offsets and determining one or more similarity values by comparing past and future data subsets within L data subsets from the data subset within the stream of data with one or more data subsets selected from a group of past and future data subsets, and producing a feature vector from the similarity values of the data subset and the similarity values of past and future data subsets, producing a feature vector from the similarity values which includes at least one similarity value of the data subset compared with the future data subset, further comprising determining one or more similarity values by comparing past and future data subsets within L data subsets from the data subset within the stream of data with one or more data subsets selected from a group of past and future data subsets, and producing a feature vector from the similarity values of the data subset and the similarity values of past and future data subsets, and classifying the feature vector to determine the segment boundary, wherein classifying the feature vector further comprises storing the similarity values in one or more similarity matrix, and applying one or more kernel functions to the similarity matrix where the kernel functions have different extent L thereby extracting different similarity values from the similarity matrix, wherein a novelty score is generated for q different values of L, so that q novelty scores are generated by applying q kernel functions of different extent L to the similarity matrix, where the feature vector is produced by concatenating the q novelty scores.

A method for determining the location of a segment boundary in a stream of data comprising determining one or more similarity values by comparing a data subset within the stream of data with one or more data subsets selected from a group of present and future data subsets, where the future data subset occurs later in time than the data subset in the stream of data and the present data subset occurs at the same time as the data subset in the stream of data, further comprising the data subsets being compared are separated by an offset, where the offset is varied between 0 and a maximum offset L, and the comparison is carried out at one or more of the varied offsets and determining one or more similarity values by comparing past and future data subsets within L data subsets from the data subset within the stream of data with one or more data subsets selected from a group of past and future data subsets, generating one or more low level features of past, future and present data subsets, and the similarity value is calculated from the pairwise comparison of the low level features by a measure selected from the group of 'modified Chi squared' measure, 'Chi squared' measure, L1 and L2; where L1 is the sum of the modulai of the difference between the low level features of the data subset and the low level features of the past, future and present data subset and L2 is the sum of the square root of the square of the difference between the low level features of the data subset and the low level features of the past, future and present data subset, and producing a feature vector from the similarity values of the data subset and the similarity values of past and future data subsets and classifying one or more sets of similarity values to determine the segment boundary, wherein determining the segment boundary further comprises determining one or more similarity values by comparing the data subset within the stream of data with one or more data subsets selected from a group of past data subsets, where the past data subset occurs earlier in time than the data subset in the stream of data, further comprising the data subsets being compared are separated by an offset, where the offset is varied between 0 and a maximum offset L, and the comparison is carried out at one or more of the varied offsets and determining one or more similarity values by comparing past and future data subsets within L data subsets from the data subset within the stream of data with one or more data subsets selected from a group of past and future data subsets, and producing a feature vector from the similarity values of the data subset and the similarity values of past and future data subsets, producing a feature vector from the similarity values which includes at least one similarity value of the data subset compared with the future data subset, further comprising determining one or more similarity values by comparing past and future data subsets within L data subsets from the data subset within the stream of data with one or more data subsets selected from a group of past and future data subsets, and producing a feature vector from the similarity values of the data subset and the similarity values of past and future data subsets, and classifying the feature vector to determine the segment boundary, wherein classifying the feature vector further comprises storing the similarity values in one or more similarity matrix, and applying one or more kernel functions to the similarity matrix where the kernel functions have different extent L thereby extracting different similarity values from the similarity matrix, where the feature vector is produced by extracting the raw pairwise data of the similarity matrices for each non-zero value in the kernel function.

A method for determining the location of a segment boundary in a stream of data comprising calculating one or more similarity values of one or more data subsets in the stream of data compared with one or more subsets of neighboring data, generating one or more similarity matrix based on the similarity value, applying one or more kernel functions of different extent L to the similarity matrix to generate one or more novelty scores for each L, varying L such that for the q different values of L the corresponding q novelty scores are entered into a feature vector, where q>1, and classifying the feature vector to determine the location of the segment boundary.

A method for determining the location of a segment boundary in a stream of data comprising calculating one or more similarity values of one or more data subsets in the stream of data compared with one or more subsets of neighboring data, generating one or more similarity matrix based on the similarity value, applying a kernel function selected from the group of a cross similarity kernel and a full similarity kernel to the similarity matrix, extracting the raw pairwise data of the similarity matrix into a feature vector for each non-zero value in a kernel function, and classifying the feature vector to determine the location of the segment boundary.

A method for determining the location of a segment boundary in a stream of data comprising calculating one or more similarity values of one or more data subsets in the stream of data compared with one or more subsets of neighboring data, generating one or more similarity matrix based on the similarity value, applying one or more kernel functions of different extent L to the similarity matrix to generate one or more novelty scores for each L, varying L such that for the q different values of L the corresponding q novelty scores are entered into a feature vector, where q>1, and classifying the feature vector to determine the location of the segment boundary, wherein the kernel function is selected from the group of a cross similarity kernel and a full similarity kernel.

A method for determining the location of a segment boundary in a stream of data comprising calculating one or more similarity values of one or more data subsets in the stream of data compared with one or more subsets of neighboring data, generating one or more low level features of past, future and present data subsets, and the similarity value is calculated from the pairwise comparison of the low level features by a measure selected from the group of 'modified Chi squared' measure, 'Chi squared' measure, L1 and L2; where L1 is the sum of the modulai of the difference between the low level features of the data subset and the low level features of the past, future and present data subset and L2 is the sum of the square root of the square of the difference between the low level features of the data subset and the low level features of the past, future and present data subset, generating one or more similarity matrix based on the similarity value, applying one or more kernel functions of different extent L to the similarity matrix to generate one or more novelty scores for each L, varying L such that for the q different values of L the corresponding q novelty scores are entered into a feature vector, where q>1, and classifying the feature vector to determine the location of the segment boundary.

A method for determining the location of a segment boundary in a stream of data comprising calculating one or more similarity values of one or more data subsets in the stream of data compared with one or more subsets of neighboring data, generating one or more low level features of past, future and present data subsets, and the similarity value is calculated from the pairwise comparison of the low level features by a measure selected from the group of 'modified Chi squared' measure, 'Chi squared' measure, L1 and L2; where L1 is the sum of the modulai of the difference between the low level features of the data subset and the low level features of the past, future and present data subset and L2 is the sum of the square root of the square of the difference between the low level features of the data subset and the low level features of the past, future and present data subset, generating one or more similarity matrix based on the similarity value, applying a kernel function selected from the group of a cross similarity kernel and a full similarity kernel to the similarity matrix, extracting the raw pairwise data of the similarity matrix into a feature vector for each non-zero value in a kernel function, and classifying the feature vector to determine the location of the segment boundary.

A method for determining the location of a segment boundary in a stream of data comprising calculating one or more similarity values of one or more data subsets in the stream of data compared with one or more subsets of neighboring data, generating one or more similarity matrix based on the similarity value, wherein the one or more similarity matrix is asymmetric, applying one or more kernel functions of different extent L to the similarity matrix to generate one or more novelty scores for each L, varying L such that for the q different values of L the corresponding q novelty scores are entered into a feature vector, where q>1, and classifying the feature vector to determine the location of the segment boundary.

A method for determining the location of a segment boundary in a stream of data comprising calculating one or more similarity values of one or more data subsets in the stream of data compared with one or more subsets of neighboring data, generating one or more similarity matrix based on the similarity value, wherein the one or more similarity matrix is asymmetric, applying a kernel function selected from the group of a cross similarity kernel and a full similarity kernel to the similarity matrix, extracting the raw pairwise data of the similarity matrix into a feature vector for each non-zero value in a kernel function, and classifying the feature vector to determine the location of the segment boundary.

A method for determining the location of a segment boundary in a stream of data comprising calculating one or more similarity values of one or more data subsets in the stream of data compared with one or more subsets of neighboring data, generating one or more similarity matrix based on the similarity value, applying one or more kernel functions of different extent L to the similarity matrix to generate one or more novelty scores for each L, varying L such that for the q different values of L the corresponding q novelty scores are entered into a feature vector, where q>1, wherein the novelty scores from non-consecutive values of L are entered into the feature vector, and classifying the feature vector to determine the location of the segment boundary.

A method for determining the location of a segment boundary in a stream of data comprising calculating one or more similarity values of one or more data subsets in the stream of data compared with one or more subsets of neighboring data, generating one or more similarity matrix based on the similarity value, applying one or more kernel functions of different extent L to the similarity matrix to generate one or more novelty scores for each L, varying L such that for the q different values of L the corresponding q novelty scores are entered into a feature vector, where q>1, wherein the feature vector is generated by applying more than one type of kernel function to the similarity matrix, and classifying the feature vector to determine the location of the segment boundary.

A method for determining the location of a segment boundary in a stream of data comprising calculating one or more similarity values of one or more data subsets in the stream of data compared with one or more subsets of neighboring data, generating one or more similarity matrix based on the similarity value, applying one or more kernel functions of different extent L to the similarity matrix to generate one or more novelty scores for each L, varying L such that for the q different values of L the corresponding q novelty scores are entered into a feature vector, where q>1, and classifying the feature vector to determine the location of the segment boundary, for determination of shot segmentation in a video.

A method for determining the location of a segment boundary in a stream of data comprising calculating one or more similarity values of one or more data subsets in the stream of data compared with one or more subsets of neighboring data, generating one or more similarity matrix based on the similarity value, applying a kernel function selected from the group of a cross similarity kernel and a full similarity kernel to the similarity matrix, extracting the raw pairwise data of the similarity matrix into a feature vector for each non-zero value in a kernel function, and classifying the feature vector to determine the location of the segment boundary, for determination of shot segmentation in a video.

A method for determining the location of a segment boundary in a stream of data comprising determining one or more similarity values by comparing a data subset within the stream of data with one or more data subsets selected from a group of present and future data subsets, where the future data subset occurs later in time than the data subset in the stream of data and the present data subset occurs at the same time as the data subset in the stream of data, further comprising the data subsets being compared are separated by an offset, where the offset is varied between 0 and a maximum offset L, and the comparison is carried out at one or more of the varied offsets and determining one or more similarity values by comparing past and future data subsets within L data subsets from the data subset within the stream of data with one or more data subsets selected from a group of past and future data subsets, and producing a feature vector from the similarity values of the data subset and the similarity values of past and future data subsets, a kNN classifier is used to determine the segment as boundary and non-boundary, and classifying one or more sets of similarity values to determine the segment boundary, wherein determining the segment boundary further comprises determining one or more similarity values by comparing the data subset within the stream of data with one or more data subsets selected from a group of past data subsets, where the past data subset occurs earlier in time than the data subset in the stream of data, further comprising the data subsets being compared are separated by an offset, where the offset is varied between 0 and a maximum offset L, and the comparison is carried out at one or more of the varied offsets and determining one or more similarity values by comparing past and future data subsets within L data subsets from the data subset within the stream of data with one or more data subsets selected from a group of past and future data subsets, and producing a feature vector from the similarity values of the data subset and the similarity values of past and future data subsets, producing a feature vector from the similarity values which includes at least one similarity value of the data subset compared with the future data subset, further comprising determining one or more similarity values by comparing past and future data subsets within L data subsets from the data subset within the stream of data with one or more data subsets selected from a group of past and future data subsets, and producing a feature vector from the similarity values of the data subset and the similarity values of past and future data subsets, and classifying the feature vector to determine the segment boundary.

A method for comparing a data subset with a neighboring data subset to determine a segment boundary comprising means for calculating one or more similarity values based on comparing one or more data subsets to one or more subsets of neighboring data, means for generating one or more similarity matrix from the similarity values, means for extracting raw pairwise data from the similarity matrix, where for each non-zero value in the kernel function the raw pairwise data of the matrix is extracted, where the kernel functions are selected from the group of a cross similarity kernel and a full similarity kernel, means for generating a feature vector from the extracted raw pairwise data, and means for classifying the feature vector with a classifier.

A method for comparing a data subset with a neighboring data subset to determine a segment boundary comprising means for calculating one or more similarity values based on comparing one or more data subsets to one or more subsets of neighboring data, means for generating one or more similarity matrix from the similarity values, means for extracting raw pairwise data from the similarity matrix, where for each non-zero value in the kernel function the raw pairwise data of the matrix is extracted, where the kernel functions are selected from the group of a cross similarity kernel and a full similarity kernel, means for generating a feature vector from the extracted raw pairwise data, and means for classifying the feature vector with a classifier, further comprising means for training a classifier with one or more feature vectors derived from one or more sets of training data and a ground truth class labeling, and means for classifying the feature vector with the trained classifier to determine the segment boundary.

A program of instructions executable by a computer to perform a function of determining segment boundaries in a stream of test data, the function comprising the steps of calculating one or more similarity values based on comparing one or more data subsets to one or more subsets of neighboring data, generating one or more similarity matrix from the similarity values, generating a feature vector by applying one or more kernel functions to the similarity matrices where the kernel functions are selected from the group of a cross similarity kernel and a full similarity kernel, training a classifier with feature vectors generated from one or more training sets of data and a ground truth class labeling, and classifying the feature vector from the test data with the trained classifier and similar feature vectors to determine the segment boundaries.

A program of instructions executable by a computer to perform a function of determining segment boundaries in a stream of test data, the function comprising the steps of calculating one or more similarity values based on comparing one or more data subsets to one or more subsets of neighboring data, generating one or more similarity matrix from the similarity values, generating a feature vector by applying one or more kernel functions to the similarity matrices where the kernel functions are selected from the group of a cross similarity kernel and a full similarity kernel, further comprising applying one or more kernel correlation functions to one or more similarity matrix to generate one or more novelty scores, and generating the feature vector by entering the novelty scores obtained for different kernel correlation function widths, training a classifier with feature vectors generated from one or more training sets of data and a ground truth class labeling, and classifying the feature vector from the test data with the trained classifier and similar feature vectors to determine the segment boundaries.

A program of instructions executable by a computer to perform a function of determining segment boundaries in a stream of test data, the function comprising the steps of calculating one or more similarity values based on comparing one or more data subsets to one or more subsets of neighboring data, generating one or more similarity matrix from the similarity values, generating a feature vector by applying one or more kernel functions to the similarity matrices where the kernel functions are selected from the group of a cross similarity kernel and a full similarity kernel, further comprising applying one or more kernel correlation functions to one or more similarity matrix, and extracting for each non-zero value in the kernel correlation function the raw pairwise data of the similarity matrix into the feature vector, training a classifier with feature vectors generated from one or more training sets of data and a ground truth class labeling, and classifying the feature vector from the test data with the trained classifier and similar feature vectors to determine the segment boundaries.

A system or apparatus for identifying a boundary and non-boundary in a stream of data, wherein the identification comprises one or more processors capable of calculating similarity values for each data subset in the stream of data, capable of creating one or more similarity matrices, capable of applying kernel functions to the matrices, capable of generating feature vectors, and classifying the data subset and a machine readable medium including operations stored thereon that when processed by the one or more processors cause a system to perform the steps of creating the similarity values for each data subset in the stream of data, creating one or more similarity matrices; applying kernel functions to the matrices, generating the feature vectors and classifying the data subset as boundary and non-boundary.

What is claimed is:

1. A method for one or both determining and distinguishing a boundary in a stream of data comprising:
   (a) determining one or more similarity values by comparing one or more data subsets within the stream of data with one or more neighboring data subsets, wherein the data subsets being compared are separated by an offset (L); where L is varied between 1 and a maximum offset (L); and the comparison is carried out at two or more L;
   (b) producing a feature vector from the similarity values, wherein the similarity values are directly combined to produce the feature vector, wherein producing the feature vector further comprises:
      storing the similarity values in one or more similarity matrices, where the similarity values are calculated from the pairwise comparison of one or more low level features of past, future and present data subsets by a measure selected from the group of 'modified Chi squared' measure, 'Chi squared' measure,
      where the modified Chi squared measure is given by $$D_{M_x^2}(X_i, X_j) = \sum_{p=1}^{P} \frac{(X_i(p) - X_j(p))^2}{(X_i(p) + X_j(p))^2},$$

and the Chi squared measure is given by $$D_{x^2}(X_i, X_j) = \sum_{p=1}^{P} \frac{(X_i(p) - X_j(p))^2}{(X_i(p) + X_j(p))},$$

where $X_i$, $X_j$ are low-level features corresponding to the $i^{th}$ and $j^{th}$ respective data subsets of the stream of data and P is the dimensionality of the low level features associated with each data subset; and
      applying two or more kernel functions to the similarity matrices; and
   c) classifying the feature vector to one or both determine and distinguish boundaries.

2. A method for determining the location of a segment boundary in a stream of data comprising:
   (a) calculating one or more similarity values of one or more data subsets in the stream of data compared with one or more subsets of neighboring data, wherein the similarity values are generated by generating one or more low level features of past, future and present data subsets, and each similarity value is calculated from the pairwise comparison of the low level features by a measure selected from the group of 'modified Chi squared' measure and 'Chi squared' measure,
   where the modified Chi squared measure is given by $$D_{M_x^2}(X_i, X_j) = \sum_{p=1}^{P} \frac{(X_i(p) - X_j(p))^2}{(X_i(p) + X_j(p))^2},$$

and the Chi squared measure is given by $$D_{x^2}(X_i, X_j) = \sum_{p=1}^{P} \frac{(X_i(p) - X_j(p))^2}{(X_i(p) + X_j(p))},$$

where $X_i$, $X_j$ are low-level features corresponding to the $i^{th}$ and $j^{th}$ respective data subsets of the stream of data and P is the dimensionality of the low level features associated with each data subset;
   (b) generating one similarity matrix based on the one or more similarity values;
   (c) applying two or more kernel functions of offset L to the similarity matrix, where the offset is varied between 1 and a maximum offset (L), to generate two or more novelty scores for each L;
   (d) varying L such that for the q different values of L the corresponding q novelty scores are entered into a feature vector, where q>1; and
   (e) classifying the feature vector to determine the location of the segment boundary.

3. A method for determining the location of a segment boundary in a stream of data comprising:
   (a) calculating one or more similarity values of one or more data subsets in the stream of data compared with one or more subsets of neighboring data, wherein the time interval between each data subset in the stream of data is a fixed amount of time, wherein calculating the one or more similarity values further comprises:

generating one or more low level features of past, future and present data subsets; and calculating each similarity value from the pairwise comparison of the low level features by a measure selected from the group of 'modified Chi squared' measure and 'Chi squared' measure, where the modified Chi squared measure is $$D_{M_x^2}(X_i, X_j) = \sum_{p=1}^{P} \frac{(X_i(p) - X_j(p))^2}{(X_i(p) + X_j(p))^2},$$

and the Chi squared measure is $$D_{\chi^2}(X_i, X_j) = \sum_{p=1}^{P} \frac{(X_i(p) - X_j(p))^2}{(X_i(p) + X_j(p))},$$

where $X_i$, $X_j$ are low-level features corresponding to the $i^{th}$ and $j^{th}$ respective data subsets of the stream of data and P is the dimensionality of the low level features associated with each data subset;

(b) generating one similarity matrix based on the one or more similarity values;

(c) applying a kernel function selected from the group of a diagonal cross similarity kernel, a scale space similarity kernel, a cross similarity kernel and a full similarity kernel to the similarity matrix;

(d) extracting the raw pairwise data of the similarity matrix into a feature vector for each non-zero value in the selected kernel function, wherein the raw pairwise data are directly combined to produce the feature vector; and (e) classifying the feature vector to determine the location of the segment boundary.

4. The method of claim 2, wherein the kernel function is selected from the group of a cross similarity kernel and a full similarity kernel.

5. The method of claim 2, wherein step (b) the similarity matrix is asymmetric.

6. The method of claim 3, wherein step (b) the similarity matrix is asymmetric.

7. The method of claim 2, wherein step (d) the novelty scores from non-consecutive values of L are entered into the feature vector.

8. The method of claim 2, wherein step (d) the feature vector is generated by applying more than one type of kernel function to the similarity matrix.

9. The method of claim 2, for determination of shot segmentation in a video.

10. The method of claim 3, for determination of shot segmentation in a video.

11. The method of claim 1, where in step (c) a kNN classifier is used to determine the segment as boundary and non-boundary.

12. A non-transitory computer readable medium having instructions stored thereon that when processed by one or more processors cause a system to execute the steps of:

(a) calculating two or more similarity values based on comparing two or more data subsets to two or more subsets of neighboring data from a set of test data;

(b) generating two similarity matrices from the two or more similarity values, where each similarity value is calculated from the pairwise comparison of the low level features by a measure selected from the group of 'modified Chi squared' measure and 'Chi squared' measure, where the modified Chi squared measure is given by $$D_{M_x^2}(X_i, X_j) = \sum_{p=1}^{P} \frac{(X_i(p) - X_j(p))^2}{(X_i(p) + X_j(p))^2},$$

and the Chi squared measure is given by $$D_{\chi^2}(X_i, X_j) = \sum_{p=1}^{P} \frac{(X_i(p) - X_j(p))^2}{(X_i(p) + X_j(p))},$$

where $X_i$, $X_j$ are low-level features corresponding to the $i^{th}$ and $j^{th}$ respective data subsets of the stream of data and P is the dimensionality of the low level features associated with each data subset;

(c) generating a feature vector by applying one or more kernel functions of offset L to the similarity matrices, where the feature vector consists of entries where L is varied between 1 and a maximum offset (L), to the similarity matrices;

(d) training a classifier with training feature vectors generated from two or more training sets of data and a ground truth class labeling; and (e) classifying the feature vector with the trained classifier to determine a set of segment boundaries for the set of test data.

13. The non-transitory computer readable medium of claim 12, where step (c) further comprises:

applying one or more kernel correlation functions to the similarity matrices to generate one or more novelty scores; and generating the feature vector by entering the novelty scores obtained for different kernel correlation function widths.

14. The non-transitory computer readable medium of claim 12, where step (c) further comprises:

extracting for each non-zero value in the kernel correlation function the raw pairwise data of the similarity matrices into the feature vector.

15. A method for determining the location of a segment boundary in a stream of data comprising:

(a) generating one or more low level features of past, future and present data subsets;

(b) determining one or more similarity values by comparing a data subset within the stream of data with one or more data subsets selected from a group of past, present and future data subsets, where the past data subset occurs earlier in time that the data subset in the stream of data, the future data subset occurs later in time than the data subset in the stream of data and the present data subset occurs at the same time as the data subset in the stream of data, wherein each similarity value is calculated from the pairwise comparison of the low level features by a measure selected from the group of 'modified Chi squared' measure and 'Chi squared' measure, where the modified Chi squared measure is given by $$D_{M_x^2}(X_i, X_j) = \sum_{p=1}^{P} \frac{(X_i(p) - X_j(p))^2}{(X_i(p) + X_j(p))^2},$$

and the Chi squared measure is given by $$D_{\chi^2}(X_i, X_j) = \sum_{p=1}^{P} \frac{(X_i(p) - X_j(p))^2}{(X_i(p) + X_j(p))},$$

where $X_i$, $X_j$ are low-level features corresponding to the $i^{th}$ and $j^{th}$ respective data subsets of the stream of data and P is the dimensionality of the low level features associated with each data subset and (c) classifying one or more sets of similarity values to determine the segment boundary.

16. The method of claim 15, wherein in step (b) determining the one or more similarity values further consists of:
storing the similarity values in one or more similarity matrices; and
applying two or more kernel functions to the one or more similarity matrices where the kernel functions have different extent of offset (L), where L is varied between 1 and a maximum offset (L), thereby extracting different similarity values from the similarity matrices.

17. The method of claim 16, wherein a novelty score is generated for q different values of L, so that q novelty scores are generated by applying q kernel functions of different L to the similarity matrices.

18. The method of claim 17, wherein in (b) the one or more similarity values are determined by concatenating the q novelty scores.

19. The method of claim 16, wherein in (b) the one or more similarity values are determined by extracting the raw pairwise data of the similarity matrices for each non-zero value in the kernel function.

20. A method for determining the location of a segment boundary in a stream of data comprising:
(a) calculating two or more similarity values of two or more data subsets in the stream of data compared with two or more subsets of neighboring data;
(b) generating a global histogram similarity matrix and a block histogram similarity matrix based on the two or more similarity values;
(c) applying a kernel function selected from the group of a diagonal cross similarity kernel, a scale space similarity kernel, a cross similarity kernel and a full similarity kernel to the similarity matrices;
(d) extracting the raw pairwise data of the similarity matrices into a feature vector for each non-zero value in the kernel function, wherein the global histogram similarity matrix and the block histogram similarity matrix data are concatenated to generate the feature vector; and
(e) classifying the feature vector to determine the location of the segment boundary.

21. The method of claim 1, where step (c) further comprises:
training one or more classifiers based on one or more feature vectors derived from one or more sets of training data and a ground truth;
classifying the feature vector from the data subset based on one or more trained classifiers as boundary and non-boundary.

22. The method of claim 1, where in step (b) comparisons between the data subset and future data subsets contribute positively to the feature vector while comparisons between the data subset and past data subsets do not contribute positively to the feature vector.

23. The method of claim 1, wherein determining the feature vector further comprises:
applying two or more kernel functions to the similarity matrices where the kernel functions have different extent of offset (L), where the offset is varied between 1 and a maximum offset (L), thereby extracting different similarity values from the similarity matrices.

24. The method of claim 23, wherein a novelty score is generated for q different values of offset (L), so that q novelty scores are generated by applying q kernel functions of different extent of offset (L) to the similarity matrices.

25. The method of claim 24, where the feature vector is produced by concatenating the q novelty scores.

26. The method of claim 23, where the feature vector is produced by extracting the raw pairwise data of the similarity matrices for each non-zero value in the kernel function.

* * * * *